(12) United States Patent
Takahashi et al.

(10) Patent No.: US 7,512,120 B2
(45) Date of Patent: Mar. 31, 2009

(54) NODE, CORRESPONDENT NODE, MOBILITY ANCHOR POINT, AND HOME AGENT IN PACKET COMMUNICATION SYSTEM, PACKET COMMUNICATION SYSTEM, AND PATH MTU DISCOVERY METHOD

(75) Inventors: Hideaki Takahashi, Yokohama (JP); Koji Omae, Yokohama (JP); Ichiro Okajima, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 857 days.

(21) Appl. No.: 10/610,932

(22) Filed: Jul. 2, 2003

(65) Prior Publication Data
US 2004/0008664 A1 Jan. 15, 2004

(30) Foreign Application Priority Data
Jul. 9, 2002 (JP) .............................. 2002-200308
Jul. 9, 2002 (JP) .............................. 2002-200328

(51) Int. Cl.
*H04L 12/66* (2006.01)
(52) U.S. Cl. ...................... 370/354; 370/249; 370/432; 370/390; 370/395
(58) Field of Classification Search ................ 370/332, 370/389–427, 395.32
See application file for complete search history.

(56) References Cited

U.S. PATENT DOCUMENTS 5,425,023 A * 6/1995 Haraguchi et al. .......... 370/400

6,341,129 B1 * 1/2002 Schroeder et al. ........... 370/354
7,006,480 B2 * 2/2006 Border et al. ............... 370/338

(Continued)

FOREIGN PATENT DOCUMENTS

JP 5-22345 1/1993
JP 11-168492 6/1999

OTHER PUBLICATIONS

H. Soliman, et al., IETF Mobile IP Working Group, Internet-Draft, XP-002253178, pp. 1-34, "Hierarchical MIPv6 Mobility Management (HMIPv6)", Jul. 5, 2002.
J. McCann, et al., IETF Network Working Group, RFC 1981, XP-002253179, pp. 1-15, "Path MTU Discovery for IP Version 6", Aug. 1996.

*Primary Examiner*—Charles N Appiah
*Assistant Examiner*—Amancio Gonzalez
(74) *Attorney, Agent, or Firm*—Oblon, Spivak, McClelland, Maier & Neustadt, P.C.

(57) ABSTRACT

In a packet communication system 1, 31 (51, 81) comprised of nodes and links, a destination node 3 (53) as a destination of a packet transmitted from correspondent node 2 (52) is provided with an advertisement receiving device 3e (53e) for receiving an advertisement of path information about a path from the correspondent node 2 (52) to the destination node 3 (53); a Path MTU discovery execution determining device 3f (53g) for determining whether a discovery of a Path MTU of the path from correspondent node 2 (52) to destination node 3 (53) should be executed, based on the path information; a Path MTU setting device 3g (53f) for setting the Path MTU on the basis of the path information; and a Path MTU announcing device 3h (53h) for announcing the Path MTU set by the Path MTU setting device 3g (53f).

26 Claims, 25 Drawing Sheets

U.S. PATENT DOCUMENTS

2002/0026525 A1* 2/2002 Armitage .................... 709/238
2002/0071436 A1* 6/2002 Border et al. .......... 370/395.32
2002/0099854 A1* 7/2002 Jorgensen ................... 709/249
2003/0187975 A1* 10/2003 Brown et al. ................ 709/224

* cited by examiner

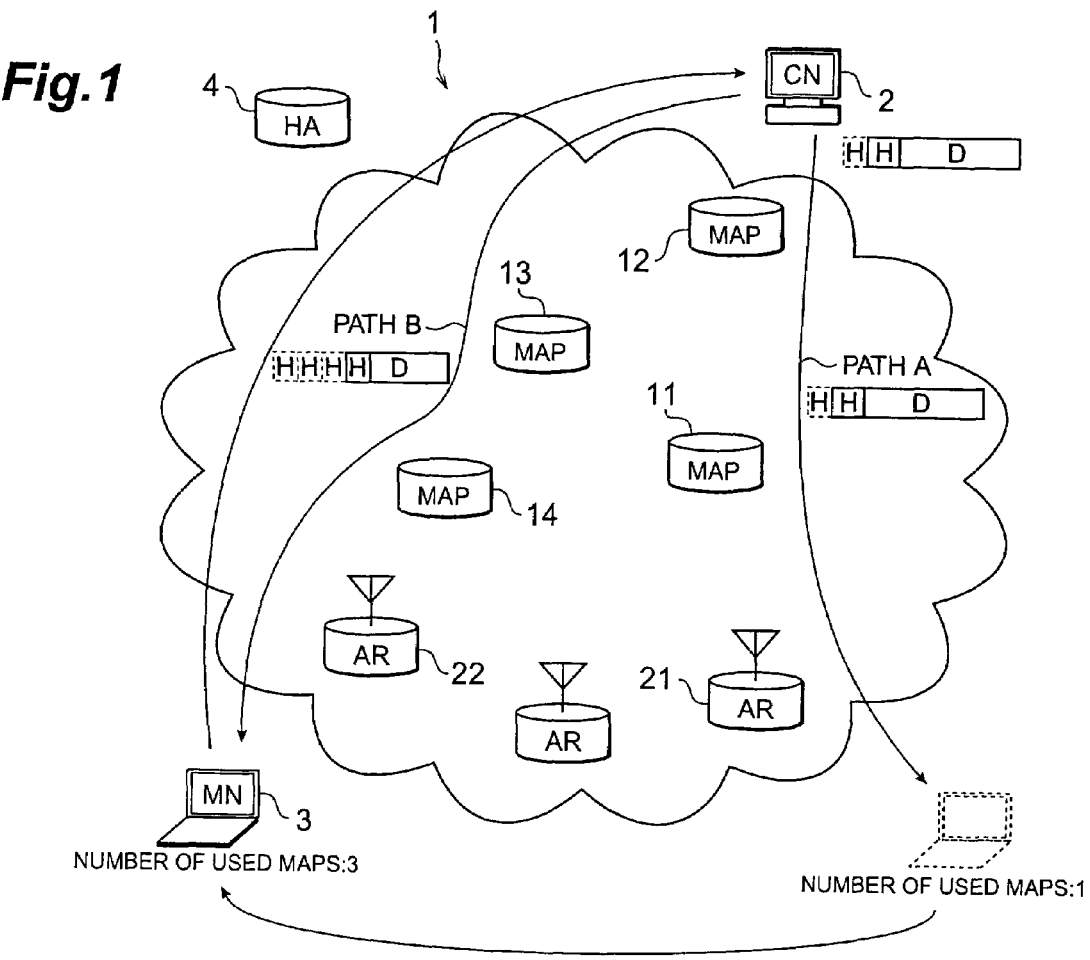

NODE, CORRESPONDENT NODE, MOBILITY ANCHOR POINT, AND HOME AGENT IN PACKET COMMUNICATION SYSTEM, PACKET COMMUNICATION SYSTEM, AND PATH MTU DISCOVERY METHOD

BACKGROUND OF THE INVENTION

1. Field of the Invention

The present invention relates to a node, a correspondent node, a mobility anchor point, and a home agent in a packet communication system comprised of nodes and links, and to a packet communication system and a Path MTU discovery method.

2. Related Background Art

An IP [Internet Protocol] network is comprised of a set of nodes and links directly interconnecting the nodes to each other. The nodes are the generic name of computers, routers for relaying communication between computers, and the like. The links presently available include several types of links such as Ethernet, FDDI [Fiber Distributed Data Interface], ATM [Asynchronous Transfer Mode], and so on. Since the IP network includes these types of links mixed, there exist different types of links on a path from a node of a source (correspondent) to a destination node during execution of data communication.

In packet communication systems for transmitting data in packet units, an MTU [Maximum Transmission Unit] of IP packets is determined for each link and this MTU for each link is called a link MTU. The link MTUs are different among links and, in the case where a link MTU is smaller than a packet size of an IP packet under transmission in the middle of the path, there arises a problem that the packet cannot be transported further. In order to avoid this problem, the IP layer is configured to fragment each IP packet into smaller fragmented packets and transport the fragmented packets onto the link with the small link MTU. In the case of the IP packet being fragmented, however, if even one fragmented packet is lost, it is impossible to recover the original IP packet, which results in loss of the entire IP packet. In order to avoid it, TCP [Transmission Control Protocol] is configured to transmit each packet in small size enough to prevent further fragmentation of the packet, but it results in degradation of transmission efficiency of the network. For overcoming it, IETF [Internet Engineering Task Force] presented a method of transmitting a packet in the minimum link MTU (i.e., Path MTU) among those of links existing on the path from the source node to the destination node and a method of discovering the Path MTU, which are standardized in RFC [Request For Comments].

When the node is a mobile node (hereinafter referred to as MN [Mobile Node]) having the mobility control function for movement in the IP network, there exists a home agent (hereinafter referred to as HA [Home Agent]) for managing global location information of the MN and mobility anchor points (hereinafter referred to as MAPs [Mobility Anchor Points]) for managing local location information of the MN are also set in the IP network. Then a packet to be transmitted to the MN is transported via the HA and MAPs to the MN. When the HA receives a packet addressed to the MN during a period in which the MN stays away from the links under control of the HA and is connected to a foreign link, it forwards the packet to an address registered in the HA and presently temporarily acquired by the MN. On that occasion, the HA adds an IP header with the source being the HA and the destination being the address presently temporarily acquired by the MN, to the packet having been transported thereto. This addition of the IP header to the original packet is called encapsulation. A node carrying out the encapsulation is called an entry point of a tunnel. The method of encapsulating the packet is also standardized in RFC by IETF. Registered in the MAPs is an address locally acquired by the MN in an area where the MAPs are set. When a MAP receives a packet addressed to the MN, it forwards the packet to the address of the MN registered in the MAP. On that occasion, the MAP adds an IP header with the source being the MAP and the destination being the registered address of MN to the packet having been transported thereto. Therefore, the packet addressed to MN is given an IP header every time it passes the HA or a MAP. Accordingly, IP headers are added up to the number of HA and MAPs existing on the path from the source node to the MN. Each node that carries out an encapsulation on the path from the source to the MN in the case of such addition of multiple IP headers as described above will be called an entry point of multiple tunnels.

SUMMARY OF THE INVENTION

In the Path MTU discovery method standardized by IETF, however, it is not possible to recognize the addition of the IP header at the HA or MAP. Therefore, for example, in the case where the packet size is the same as the size of the link MTU of the previous link before arrival at these nodes (HA and MAPs) and where the MTUs of the previous and subsequent links are equal, the encapsulation at the node (HA or MAP) increases the packet size by the degree equivalent to the size of the added IP header. For this reason, the packet size exceeds the MTU of the subsequent link by the added IP header size, so that the packet cannot be transported further.

When the movement of MN to update the path results in making the number of entry points of multiple tunnels on the path from the correspondent node (hereinafter referred to as CN [Correspondent Node]) to the MN before the movement different from that after the movement or results in making the Path MTU of the path from CN to MN before the movement different from that after the movement, the system operates as follows if the discovery is carried out by the Path MTU discovery method standardized by IETF. It is assumed herein that the procedure of encapsulating a packet at an entry point of multiple tunnels follows the method standardized in (RFC2473) "Generic Packet Tunneling in IPv6 Specification" and the procedure of the Path MTU discovery follows the method standardized in (RFC1981) "Path MTU Discovery for IP version 6".

The operation in packet communication system 101 in the case where the number of entry points of multiple tunnels before the movement is different from that after the movement will be described with reference to FIG. 24. The description herein will focus on an example wherein in packet communication system 101 CN 102 transmits a packet to MN 103 as a destination node.

First described is a case where MN 103 moves to cause a handoff from an access router (hereinafter referred to as AR [Access Router]) 121 to AR 122 as a connected node, so as to increase the number of MAPs on the path from CN 102 to MN 103. Since there exists one MAP 111 on the path A before the movement, a packet addressed to MN 103 from CN 102 undergoes an encapsulation. Since there exist three MAPs 112, 113, and 114 on the path B after the movement, a packet addressed to MN 103 from CN 102 undergoes three encapsulations. Therefore, if the packet is transmitted in the same size as the packet size upon the transmission on the path A, after the update to the path B, the encapsulation at MAP 113 set at the second position on the path B increases the packet size by the IP header size, so that the packet cannot be transported further to the next hop. On this occasion, MAP 113 sends an ICMP [Internet Control Message Protocol] Packet Too Big message (hereinafter referred to as an ICMPPTB message) to CN 102, to announce the link MTU of the next hop to the CN. The CN 102, receiving the ICMPPTB message, executes the Path MTU discovery on the basis of the link MTU thus announced, updates the Path MTU preserved in itself, to the rediscovered Path MTU, changes the packet size based on the updated Path MTU, and then retransmits the packet. MAP 114 repeats similar operation, so that the number of Path MTU discovery operations increases by the increased number of MAPs (two).

Described next is a case where MN 103 moves to cause a handoff from AR 122 to AR 121 as a connected node, so as to decrease the number of MAPs on the path from CN 102 to MN 103 and increase the Path MTU. Since there exist three MAPs 112, 113, 114 on the path B before the movement, a packet addressed to MN 103 from CN 102 undergoes three encapsulations. Since there exists one MAP 111 on the path A after the movement, a packet addressed to MN 103 from CN 102 undergoes one encapsulation. Therefore, the actual Path MTU on the path A is increased by the header size added by the two more encapsulations on the path B (IP header size×2), as compared with the Path MTU on the path B. In the Path MTU discovery method standardized by IETF, however, after a lapse of ten minutes since the end of the previous Path MTU discovery, the Path MTU discovery is again carried out by using as an assumed Path MTU the MTU of the link to which the transmission interface to the next hop in transmission of the packet addressed to MN 103 from CN 102 is connected. Accordingly, with increase of the Path MTU, the Path MTU preserved in CN 102 is not updated before the lapse of ten minutes since the end of the previous Path MTU discovery.

The operation in the Path MTU discovery in packet communication system 201 in the case where the Path MTU before the movement is different from that after the movement will be described with reference to FIG. 25. Described herein is an example where in the packet communication system 201 CN 202 transmits a packet to MN 203. The MN 203 has the mobility control function for migration in the IP network.

First described is a case where MN 203 moves to cause a handoff from AR 221 to AR 222 as a connected node, so as to decrease the Path MTU. The MN 203 establishes path A to communicate with CN 202 under control of AR 221 as a connected node, and the CN 202 is transmitting IP packets in the size equal to the Path MTU of 4352 bytes of the path A to the MN 203. Suppose the MN 203 moved to cause a handoff to AR 222 as a connected node and went into the control area of AR 222 to establish path B. On this occasion, the CN 202 continues transmitting IP packets in the size of 4352 bytes to MN 203 even after the movement of MN 203 into the control area of AR 222.

However, since the link MTU of the link downstream of the router 213 on the path B is 1500 bytes, the router 213 cannot transmit an IP packet further down and thus discards the IP packet. Then the router 213 sends an ICMPPTB message to CN 202 being the source of the IP packet to announce that the link MTU ahead of the router 213 is 1500 bytes. The CN 202, receiving the announcement, updates the value of Path MTU preserved in itself to 1500 bytes. After the update, the CN 202 changes the packet size of IP packets addressed to MN 203 to 1500 bytes and retransmits the discarded IP packet. However, since the link MTU ahead of the router 214 is 576 bytes, the router 214 cannot transmit the IP packet further down and thus discards the IP packet. Then the router 214 transmits an ICMPPTB message to the CN 202 being the source of the IP packet to announce that the link MTU ahead of the router 214 is 576 bytes. The CN 202, receiving the announcement, again updates the value of Path MTU preserved in itself to 576 bytes. After the update, the CN 202 changes the packet size of IP packets addressed to MN 203 to 576 bytes and retransmits the discarded IP packet. Through the above process, the IP packets reach the MN 203 after the movement. This means that the IP packets cannot be transmitted to MN 203 unless the CN 202 performs the two Path MTU discoveries after the update of the path to path B.

Described next is a case where MN 203 moved to cause a handoff from AR 222 to AR 221 as a connected node, so as to increase the Path MTU. The MN 203 establishes the path B to communicate with CN 202 under the control of AR 222 as a connected node, and the CN 202 is transmitting IP packets in the size equal to the Path MTU of 576 bytes of the path B to MN 203. Suppose MN 203 moved to cause a handoff to AR 221 as a connected node, and went into the control area of AR 221 to establish path A. In this case, since the Path MTU of the path A is 4352 bytes, it is increased from the Path MTU of the path B (576 bytes). In the Path MTU discovery method standardized by IETF, however, after a lapse of ten minutes since the end of the previous Path MTU discovery, the CN 202 again performs the Path MTU discovery on the basis of the link MTU of the link to which the transmission interface to the next hop is connected on the occasion of transmission of an IP packet from CN 202 to MN 203, to update the preserved Path MTU. This rediscovery permits the CN 202 to cope with the increase of Path MTU. Accordingly, even with the update to the path A to increase the Path MTU to 4352 bytes, the IP packets are continuously transmitted in the size of the Path MTU of 576 bytes preserved during the transmission on the path B, before the lapse of ten minutes since the end of the previous Path MTU discovery. For this reason, while it is possible to transmit IP packets in the packet size of 4352 bytes on the path A, the IP packets are transmitted in the packet size of 576 bytes for ten minutes since the end of the previous Path MTU discovery, thereby resulting in lowering the transmission efficiency.

Namely, the Path MTU discovery method standardized by IETF has the following problems. The first problem is an increase in the number of Path MTU discoveries. When there exist entry points of multiple tunnels on the path from CN to MN, it is necessary to perform the Path MTU discoveries in the number equal to the number of entry points of multiple tunnels. As the number of entry points of multiple tunnels on the path increases with movement of MN, the number of Path MTU discoveries increases by the increased number. If there exist links with different MTUs on the path, the number of Path MTU discoveries will become large before discovery of the final Path MTU. Furthermore, a new discovery is not carried out before the lapse of ten minutes since the end of the Path MTU discovery; and, therefore, in the case where the MN moves to decrease the number of entry points of multiple tunnels on the path and increase the actual Path MTU or in the case where the MN moves to increase or decrease the Path MTU on the path, the conventional method cannot quickly respond to the increase or decrease of the Path MTU.

An object of the present invention is, therefore, to provide a node, a correspondent node, a mobility anchor point, and a home agent in a packet communication system capable of performing efficient Path MTU discovery while quickly responding to change of the Path MTU and to provide a packet communication system and a Path MTU discovery method.

A node in a packet communication system according to the present invention is a node in a packet communication system comprised of nodes and links, the node being a destination node as a destination of a packet transmitted from a correspondent node, the destination node comprising: advertisement receiving means for receiving an advertisement of path information about a path from the correspondent node to the destination node; Path MTU discovery execution determining means for determining whether a discovery of a Path MTU of the path from the correspondent node to the destination node should be executed, based on the path information; Path MTU setting means for setting the Path MTU on the basis of the path information; and Path MTU announcing means for announcing the Path MTU set by the Path MTU setting means.

The node in this packet communication system collects the path information about the path from the correspondent node to the destination node. The node then determines whether the discovery of the Path MTU should be executed, based on the collected path information, sets the Path MTU based thereon, and announce the set Path MTU to the correspondent node or the like. Therefore, the correspondent node can perform the Path MTU discovery with the announced Path MTU, whereby it is feasible to decrease the number of Path MTU discoveries and perform the efficient Path MTU discovery while quickly responding to change of the Path MTU.

The path information is a variety of information on the path from the correspondent node to the destination node: for example, it is information about link MTUs, path MTU, or entry points of multiple tunnels. The setting of Path MTU at the Path MTU setting means also encompasses a case of calculating the Path MTU on the basis of the path information.

Another node in a packet communication system according to the present invention is a node in a packet communication system comprised of nodes and links, the node being a destination node as a destination of a packet transmitted from a correspondent node, the destination node comprising: multiple tunnel entry-point advertisement receiving means for receiving an advertisement of information about an entry point of multiple tunnels on a path from the correspondent node to the destination node; Path MTU discovery execution determining means for determining whether a discovery of a Path MTU of the path from the correspondent node to the destination node should be executed, based on the number of entry points of multiple tunnels; Path MTU calculating means for calculating the Path MTU on the basis of the number of entry points of multiple tunnels; and Path MTU announcing means for announcing the Path MTU calculated by the Path MTU calculating means.

The node in the packet communication system is configured to collect the information about every entry point of multiple tunnels on the path, calculate the Path MTU based on the information about every entry point of multiple tunnels, and announce the Path MTU to the correspondent node. This calculated Path MTU is determined in consideration of the increase or decrease of the header size due to the encapsulation at every entry point of multiple tunnels existing on the path. For this reason, the use of the announced Path MTU frees the correspondent node from execution of the Path MTU discovery according to the number of entry points of multiple tunnels.

It is noted that every entry point of multiple tunnels encompasses both multiple encapsulations at the HA and MAPs on the path and a single encapsulation at the HA or MAP on the path.

The above node in the packet communication system according to the present invention may be configured so that the destination node is a mobile node that can move in the packet communication system, and so that the multiple tunnel entry-point advertisement receiving means determines that a MAP existing on the path from the correspondent node to the mobile node and managing local movement of the mobile node is an entry point of multiple tunnels.

When the mobile node moves to update the path and increase or decrease the number of MAPs (entry points of multiple tunnels), the node in the packet communication system collects the information about MAPs on the path after the update, calculates the Path MTU based on the information about MAPs, and announces the Path MTU to the correspondent node. The calculated Path MTU is determined in consideration of the increase or decrease of the header size due to the encapsulations at the MAPs existing on the path. For this reason, the use of the announced Path MTU frees the correspondent node from execution of the Path MTU discovery even with increase in the number of MAPs on the path after the update, and the correspondent node can quickly update the Path MTU even with the increase of the Path MTU due to the decrease in the number of MAPs on the path after the update. Furthermore, each MAP carrying out the encapsulation does not have to transmit an ICMPPTB message resulting from the encapsulation, to the correspondent node.

The above node in the packet communication system according to the present invention may also be configured so that the Path MTU discovery execution determining means determines whether the discovery of the Path MTU should be executed, based on the number of MAPs existing on the path from the correspondent node to the mobile node.

This node in the packet communication system can readily determine whether the Path MTU discovery should be executed, on the basis of the number of MAPs, even with movement of the mobile node to update the path.

The above node in the packet communication system according to the present invention may also be configured as follows: the multiple tunnel entry-point advertisement receiving means determines that each MAP selected upon a movement of the mobile node to update the path is the entry point of multiple tunnels; the Path MTU discovery execution determining means compares the number of MAPs existing on the path from the correspondent node to the mobile node before the movement of the mobile node with that after the movement of the mobile node and determines that the discovery of the Path MTU should be executed, when the number of MAPs before the movement is different from that after the movement; the Path MTU calculating means calculates the Path MTU according to (the Path MTU before the movement−a header length added at a MAP×(the number of MAPs after the movement−the number of MAPs before the movement)); and the Path MTU announcing means announces the Path MTU calculated by the Path MTU calculating means, by a binding update message (hereinafter referred to as BU [Binding Update] message).

With a movement of the mobile node to update the path, the node in the packet communication system can quickly determine whether the Path MTU discovery should be executed, according to the numbers of MAPs before and after the movement. Furthermore, this node can readily calculate the Path MTU, based on the difference between the numbers of MAPs before and after the movement.

The above node in the packet communication system according to the present invention may also be configured so that a MAP in an arbitrary layer existing on the path from the correspondent node to the mobile node sequentially announces information about a MAP in each layer announced by a MAP in a higher layer than the arbitrary layer and information of its own including a selection priority and layer information, to a MAP in a lower layer than the arbitrary layer, and so that the multiple tunnel entry-point advertisement receiving means receives information about a MAP in each layer announced by a MAP in a lowest layer existing on the path from the correspondent node to the mobile node, from a connected node and selects a MAP in each layer on the basis of selection priorities in the information about MAPs.

This node in the packet communication system receives the selectivity priorities, layer information, etc. of the MAPs in all the layers existing on the various paths from the correspondent node to the mobile node, classifies the MAPs into the layers, based on the layer information, and compares the selection priories of MAPs in each layer, whereby it can readily select MAPs existing on the path from the correspondent node to the mobile node.

The layers of MAPs are defined in various paths on the network from the correspondent node to mobile node so that in each path there are higher layers on the correspondent node side and lower layers on the mobile node side. The selection priorities are priorities for selection among MAPs in the same layer and are set in consideration of the numbers of hops from MN to each MAP and delays. The layer information is information indicating in which layer a MAP is on the path, and is, for example, the number of hops between the MN and the MAP, or the like.

Another node in a packet communication system according to the present invention is a node in a packet communication system comprised of nodes and links, the node being a destination node as a destination of a packet transmitted from a correspondent node, the destination node comprising: link MTU advertisement receiving means for receiving an advertisement of a link MTU of a link connected to each node on a path from the correspondent node to the destination node; Path MTU setting means for setting a Path MTU of the path from the correspondent node to the destination node, out of link MTUs received by the link MTU advertisement receiving means; Path MTU discovery execution determining means for determining whether a discovery of a Path MTU should be executed, on the basis of the Path MTU set by the Path MTU setting means; and Path MTU announcing means for announcing the Path MTU set by the Path MTU setting means.

This node in the packet communication system collects the information about link MTUs from the nodes on the path and sets the Path MTU based on the collected link MTUs. Then the destination node determines whether the Path MTU discovery is necessary, on the basis of the set Path MTU and, when necessary, it announces the set Path MTU to the correspondent node. For this reason, even if there are many links with different MTUs on the path, the correspondent node can update the preserved Path MTU on the basis of the announced Path MTU, whereby the number of Path MTU discoveries can be decreased by the number of link MTUs in the scope collected by the destination node.

The above node in the packet communication system according to the present invention may be configured so that the destination node is a mobile node that can move in the packet communication system, and the link MTU advertisement receiving means retrieves a link MTU of each mobility anchor point existing on the path from the correspondent node to the mobile node and managing local movement of the mobile node.

When the mobile node moves to update the path to increase or decrease MAPs and change the Path MTU, the node in the packet communication system collects the information about link MTUs from the MAPs on the path, sets the Path MTU based on the information about the link MTUs of the respective MAPs, and announces the Path MTU to the correspondent node. For this reason, even if the movement of the mobile node increases or decreases the number of links with different MTUs on the path, the correspondent node can update the preserved Path MTU on the basis of the announced Path MTU, whereby it does not have to perform the Path MTU discovery according to the increase in the number of MAPs (the number of links with different MTUs) and whereby even with the increase or decrease of the Path MTU due to the decrease in the number of MAPs the correspondent node can quickly update the Path MTU to the increased or decreased Path MTU.

The above node in the packet communication system according to the present invention may be configured as follows: the link MTU advertisement receiving means retrieves a link MTU of each MAP existing on the path, from an advertisement of the link MTU from the MAP; the Path MTU setting means sets a minimum link MTU among link MTUs of MAPs retrieved by the link MTU advertisement receiving means, as a Path MTU; the Path MTU discovery execution determining means compares the Path MTU before the movement of the mobile node with that after the movement and determines that the discovery of the Path MTU should be executed, when the Path MTU before the movement is different from that after the movement; and the Path MTU announcing means announces the Path MTU set by the Path MTU setting means, by a BU message.

When the movement of the mobile node update the path, the node in the packet communication system can quickly retrieve the link MTUs of MAPs on the path after the update out of the announcements from the MAPs, and readily set the Path MTU by extracting the minimum out of the retrieved link MTUs. Furthermore, this node can quickly and readily determine whether the Path MTU discovery should be executed, by simply comparing the Path MTUs before and after the movement.

A correspondent node in a packet communication system according to the present invention is a correspondent node in a packet communication system comprised of nodes and links, the correspondent node transmitting a packet to the above destination node, the correspondent node updating a Path MTU preserved in itself, based on the Path MTU announced by the Path MTU announcing means.

When there exist a plurality of entry points of multiple tunnels on the path, the correspondent node in the packet communication system can update the preserved Path MTU on the basis of the Path MTU announced by the node, and thus does not have to perform the Path MTU discovery according to the number of entry points of multiple tunnels. This correspondent node updates the Path MTU preserved in itself, based on the Path MTU announced by the destination node, whereby the updated Path MTU is determined taking account of the information about the link MTUs of links of the respective nodes on the path collected at the destination node. Therefore, the correspondent node does not have to perform the Path MTU discovery according to the number of links with different MTUs on the path. This update of the Path MTU is assumed to encompass a case where the Path MTU is updated to the announced Path MTU as it is and a case where the Path MTU discovery is carried out using the announced Path MTU and the Path MTU is updated to a rediscovered Path MTU.

The above correspondent node in the packet communication system according to the present invention may be configured as follows: the destination node is a mobile node that can move in the packet communication system; and upon a movement of the mobile node to update a connected node, the correspondent node updates the Path MTU preserved in itself, based on the Path MTU announced by the Path MTU announcing means, changes a packet size on the basis of the updated Path MTU, and transmits a packet of the changed packet size to the mobile node.

When the mobile node moves to update the path, the correspondent node in the packet communication system updates the Path MTU preserved in itself, based on the Path MTU announced by the mobile node, and thus the correspondent node does not have to perform the Path MTU discovery according to the increase or decrease of MAPs through the movement. Even if the number of links with different MTUs on the path increases or decreases upon the update of the path due to the movement of the mobile node, the correspondent node can update the Path MTU preserved in itself, based on the announced Path MTU, whereby the updated Path MTU is determined taking account of the information about the link MTUs of links connected to the MAPs, collected at the mobile node. Accordingly, the number of Path MTU discoveries does not increase depending upon the increase in the number of MAPs (the number of links with different MTUs), and even with increase or decrease of the Path MTU due to the decrease in the number of MAPs the correspondent node can quickly update the Path MTU to the increased or decreased Path MTU.

A MAP in a packet communication system according to the present invention is a MAP in a packet communication system comprised of nodes and links, the MAP being a MAP managing local movement of the above mobile node, the MAP announcing to a MAP is a lower layer existing on the path from the correspondent node to the mobile node, information about a MAP in each layer announced by a MAP in a higher layer existing on the path, and information of its own including a selection priority and layer information.

The MAP in the packet communication system sequentially announces the information of itself to the lower-layer MAP while accumulating the information about the upper-layer MAPs on the path from the correspondent node to the mobile node, whereby it is feasible to finally announce the information about the MAPs in all the layers existing on the path, to the mobile node.

Another MAP in a packet communication system according to the present invention is a MAP in a packet communication system comprised of nodes and links, the MAP being a MAP managing local movement of the above mobile node, the MAP comprising: link MTU announcing means for announcing a link MTU of a link connected to the MAP, to the mobile node.

Since the MAP in the packet communication system announces the link MTU of the link connected to itself, to the mobile node, the mobile node can readily collect the information about the link MTUs of the MAPs on the path.

The above MAP in the packet communication system according to the present invention may be configured so that the link MTU announcing means announces the link MTU by adding the link MTU to an acknowledgement message to a BU message transmitted from the mobile node.

When the mobile node issues the BU message to the MAPs, each MAP in the packet communication system sends the acknowledgement message thereto, whereby the mobile node can collect the information about link MTUs of the MAPs by their acknowledgement messages.

An HA in a packet communication system according to the present invention is an HA in a packet communication system comprised of nodes and links, the HA being an HA managing global movement of the above mobile node, the HA comprising: multiple tunnel entry-point determining means for determining whether the HA is an entry point of multiple tunnels on the path from the correspondent node to the mobile node; Path MTU calculating means for calculating a Path MTU of the path from the correspondent node to the mobile node, based on the number of entry points of multiple tunnels at the HA; and Path MTU announcing means for announcing the Path MTU calculated by the Path MTU calculating means, to the correspondent node.

When the node itself is an entry point of multiple tunnels on the path from the correspondent node to the mobile node, the HA in the packet communication system calculates the Path MTU on the basis of the number of entry points of multiple tunnels at the node itself and announces the Path MTU to the correspondent node. This calculated Path MTU allows for the increase or decrease of the header size due to the encapsulation at the HA existing on the path. For this reason, even if there exists the HA on the path, the correspondent node does not have to perform the Path MTU discovery for the encapsulation at the HA, thanks to the announced Path MTU.

The above HA in the packet communication system according to the present invention may be configured so that the Path MTU calculating means recalculates the Path MTU, based on the Path MTU announced by the mobile node, and so that the Path MTU announcing means announces the Path MTU calculated by the Path MTU calculating means, by an ICMPPTB message.

This HA in the packet communication system can readily calculate the Path MTU, based on the Path MTU announced from the mobile node and the number of entry points of multiple tunnels at its own node.

Another HA in a packet communication system according to the present invention is an HA in a packet communication system comprised of nodes and links, the HA being an HA managing global movement of the above mobile node, the HA comprising: on-path determining means for determining whether the HA exists on the path from the correspondent node to the mobile node; Path MTU setting means for setting a Path MTU of the path from the correspondent node to the mobile node, based on a link MTU of a link connected to the HA; and Path MTU announcing means for announcing the Path MTU set by the Path MTU setting means, to the correspondent node.

When the HA itself exists on the path from the correspondent node to the mobile node, the HA in the packet communication system sets the Path MTU, based on the link MTU of the link connected to its own node, and announces the Path MTU to the correspondent node. For this reason, the correspondent node does not have to perform the rediscovery of the Path MTU based on the link MTU of the link connected to the HA, even in the case where the HA exists on the path.

The above HA in the packet communication system according to the present invention may be configured so that the Path MTU setting means sets a new Path MTU, based on the Path MTU announced by the mobile node, and so that the Path MTU announcing means sends an ICMPPTB message containing the Path MTU set by the Path MTU setting means, to the correspondent node.

The HA in the packet communication system can readily set the Path MTU, based on the Path MTU announced by the mobile node and the link MTU of the link connected to its own node. Even if there exist a number of links with different MTUs on the path, the correspondent node can decrease the number of discoveries of the Path MTU corresponding to the number of the link MTUs in the scope collected by the destination node and the link MTU of the HA.

A packet communication system according to the present invention is a packet communication system comprised of nodes and links, wherein a destination node as a destination of a packet transmitted from a correspondent node, comprises: advertisement receiving means for receiving an advertisement of path information about a path from the correspondent node to the destination node; Path MTU discovery execution determining means for determining whether a discovery of a Path MTU of the path from the correspondent node to the destination node should be executed, based on the path information; Path MTU setting means for setting the Path MTU on the basis of the path information; and Path MTU announcing means for announcing the Path MTU set by the Path MTU setting means, and wherein the correspondent node updates a Path MTU preserved in itself, based on the Path MTU announced by the Path MTU announcing means.

In this packet communication system, the correspondent node performs the Path MTU discovery, using the Path MTU based on the path information announced by the destination node, whereby the packet communication system can decrease the number of Path MTU discoveries, achieve the efficient Path MTU discovery, and quickly respond to change of the Path MTU.

Another packet communication system according to the present invention is a packet communication system comprised of nodes and links, wherein a destination node as a destination of a packet transmitted from a correspondent node, comprises: multiple tunnel entry-point advertisement receiving means for receiving an advertisement of information about an entry point of multiple tunnels on a path from the correspondent node to the destination node; Path MTU discovery execution determining means for determining whether a discovery of a Path MTU of the path from the correspondent node to the destination node should be executed, based on the number of entry points of multiple tunnels; Path MTU calculating means for calculating the Path MTU on the basis of the number of entry points of multiple tunnels; and Path MTU announcing means for announcing the Path MTU calculated by the Path MTU calculating means, and wherein the correspondent node updates a Path MTU preserved in itself, based on the Path MTU announced by the Path MTU announcing means.

In this packet communication system, the correspondent node can update the Path MTU preserved in itself, based on the Path MTU calculated based on the number of entry points of multiple tunnels at the destination node and announced thereby, whereby the correspondent node does not have to perform the Path MTU discovery according to the number of entry points of multiple tunnels.

Another packet communication system according to the present invention is a packet communication system comprised of nodes and links, wherein a destination node as a destination of a packet transmitted from a correspondent node, comprises: link MTU advertisement receiving means for receiving an advertisement of a link MTU of a link connected to each node on a path from the correspondent node to the destination node; Path MTU setting means for setting a Path MTU of the path from the correspondent node to the destination node, out of link MTUs received by the link MTU advertisement receiving means; Path MTU discovery execution determining means for determining whether a discovery of a Path MTU should be executed, based on the Path MTU set by the Path MTU setting means; and Path MTU announcing means for announcing the Path MTU set by the Path MTU setting means, and wherein the correspondent node updates a Path MTU preserved in itself, based on the Path MTU announced by the Path MTU announcing means.

In the packet communication system, the correspondent node can update the Path MTU preserved in itself, based on the Path MTU set based on the information about the link MTUs at the destination node and announced thereby, whereby, even in the case where there are a number of links with different MTUs on the path, the correspondent node can decrease the number of discoveries of the Path MTU corresponding to the number of link MTUs within the scope collected by the destination node.

A Path MTU discovery method at a node in a packet communication system according to the present invention is a Path MTU discovery method at a destination node as a destination of a packet transmitted from a correspondent node in a packet communication system comprised of nodes and links, the method comprising: an advertisement receiving step of receiving an advertisement of path information about a path from the correspondent node to the destination node; a Path MTU discovery execution determining step of determining whether a discovery of a Path MTU of the path from the correspondent node to the destination node should be executed, based on the path information; a Path MTU setting step of setting the Path MTU on the basis of the path information; and a Path MTU announcing step of announcing the Path MTU set in the Path MTU setting step.

Another Path MTU discovery method at a node in a packet communication system according to the present invention is a Path MTU discovery method at a destination node as a destination of a packet transmitted from a correspondent node in a packet communication system comprised of nodes and links, the method comprising: a multiple tunnel entry-point advertisement receiving step of receiving an advertisement of information about an entry point of multiple tunnels on the path from the correspondent node to the destination node; a Path MTU discovery execution determining step of determining whether a discovery of a Path MTU of the path from the correspondent node to the destination node should be executed, based on the number of entry points of multiple tunnels; a Path MTU calculating step of calculating the Path MTU on the basis of the number of entry points of multiple tunnels; and a Path MTU announcing step of announcing the Path MTU calculated in the Path MTU calculating step.

A Path MTU discovery method at a node in a packet communication system according to the present invention is a Path MTU discovery method at a destination node as a destination of a packet transmitted from a correspondent node in a packet communication system comprised of nodes and links, the method comprising: a link MTU advertisement receiving step of receiving an advertisement of a link MTU of a link connected to each node on a path from the correspondent node to the destination node; a Path MTU setting step of setting a Path MTU of the path from the correspondent node to the destination node, out of link MTUs received in the link MTU advertisement receiving step; a Path MTU discovery execution determining step of determining whether a discovery of a Path MTU should be executed, on the basis of the Path MTU set in the Path MTU setting step; and a Path MTU announcing step of announcing the Path MTU set in the Path MTU setting step.

The Path MTU discovery methods described above achieve effects similar to those achieved by the aforementioned node in the packet communication system.

BRIEF DESCRIPTION OF THE DRAWINGS

FIG. 1 is an illustration showing the whole configuration of the packet communication system according to the first embodiment.

DETAILED DESCRIPTION OF THE PREFERRED EMBODIMENTS

Figure 2A:
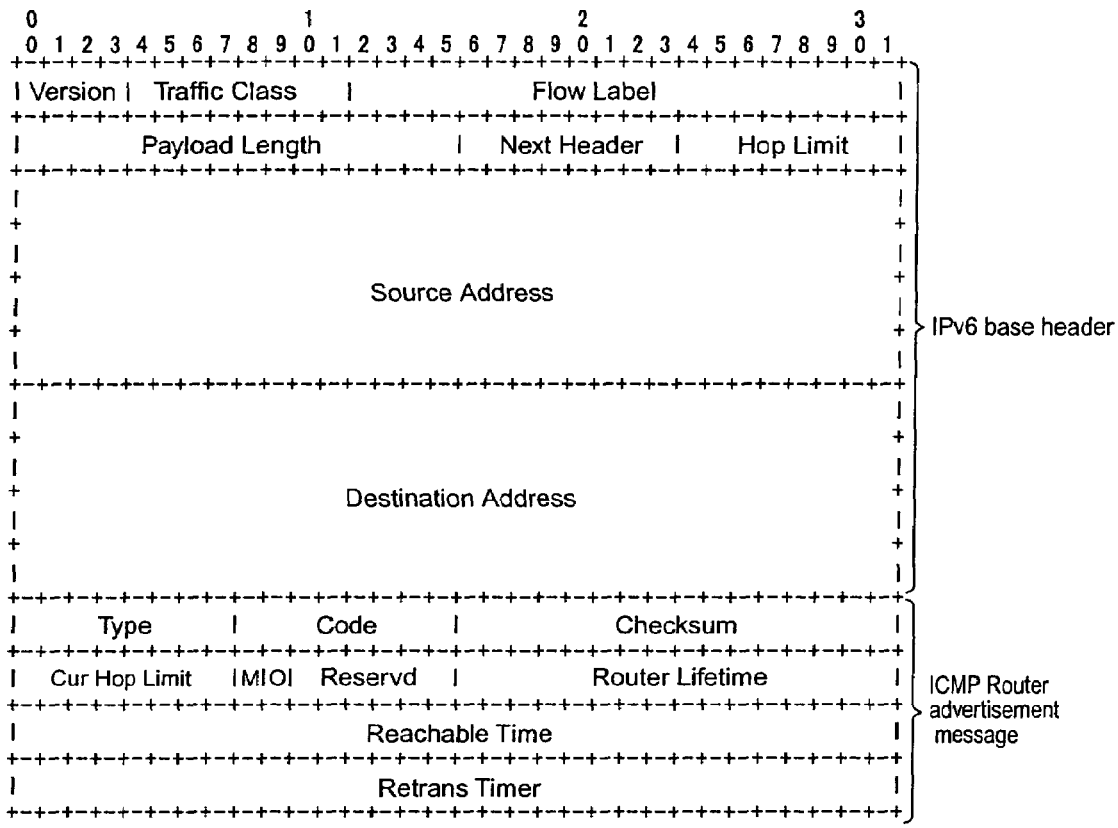
FIG. 2A shows a format of a router advertisement message for transmission of information about the MAP in FIG. 1.

Embodiments of the node, communication node, MAP, and HA in the packet communication system, the packet communication system, and the Path MTU discovery method according to the present invention will be described below with reference to the drawings.

According to the present invention, in order to implement the efficient Path MTU discovery quickly adaptable to change of Path MTU, the destination node (particularly, an MN) collects information on the path from the CN and announces the Path MTU based on the collected information to the CN. More specifically, according to the present invention, the destination node (particularly, an MN) collects information about entry points of multiple tunnels (particularly, MAPs) existing on the path from the CN, calculates the Path MTU on the basis of the information about the entry points of multiple tunnels thus collected, and announces the Path MTU to the CN. For implementing it, in the present invention, each MAP existing on the path announces the information about MAPs announced by an upper-layer MAP and information about itself sequentially to a lower-layer MAP, whereby the MN acquires the information about MAPs in all layers existing on each path, from the connected node. Particularly, in the present invention, where the HA is an entry point of multiple tunnels existing on the path between MN and CN, the HA recalculates the Path MTU on the basis of the number of entry points of multiple tunnels at the node HA itself and the Path MTU announced by the MN, and announces the Path MTU to the CN. In the present invention, the destination node (particularly, an MN) collects link MTUs of links connected to respective nodes (particularly, MAPS) existing on the path from the CN, and announces a minimum of the link MTUs thus collected, as the Path MTU to the CN. For that purpose, in the present invention, each MAP announces its link MTU to the MN by an acknowledgement message to a BU message sent from the MN. Particularly, in the present invention, where the an HA exists on the path between MN and CN, the HA sets another Path MTU on the basis of the link MTU of the link connected to the node HA itself and the Path MTU announced by the MN, and announces the thus-set Path MTU to the CN.

In the embodiments, the present invention is applied to the discovery of the Path MTU in the case where during transmission of packets from CN to MN in the packet communication system the MN migrates to update the path. The embodiments consist of four embodiments: the first embodiment and the second embodiment are examples wherein the MN collects the information about entry points of multiple tunnels on the path; the third embodiment and the fourth embodiment are examples wherein the MN collects the link MTUs on the path; the first embodiment and the third embodiment are the examples wherein a update from path A to path B takes place to increase the number of MAPs existing on the path and wherein there exists no HA on the paths A, B; the second embodiment and the fourth embodiment are the examples wherein a update from path B to path A takes place to decrease the number of MAPs existing on the path and increase the Path MTU and wherein there exists an HA on the paths A, B.

First, the first embodiment will be described. The whole configuration of packet communication system 1 in the first embodiment will be described with reference to FIG. 1. FIG. 1 is an illustration showing the whole configuration of the packet communication system in the first embodiment.

The packet communication system 1 is constructed on an IP network consisting of a great number of nodes and links. The nodes include various computers, stationary telephones, mobile telephones, relay devices for relaying communication between these devices, and so on. The links interconnect the nodes to each other and, for example, include the public telephone lines, Ethernet, FDDI, ATM, and so on.

It is assumed that in the packet communication system 1, while CN 2 was transmitting data on path A to MN 3, the MN 3 moved to cause a handoff from AR 21 to AR 22 as a connected node and a update to path B. There exists one MAP 11 on the path A from CN 2 to MN 3, and downstream of the MAP 11 packets are transmitted in the packet size resulting from addition of the IP header size (40 bytes) for an encapsulation at MAP 11 to the Path MTU of 1260 bytes held by the CN 2. On the other hand, there exist three MAPs 12, 13, and 14 on the path B from CN 2 to MN 3. Let us suppose that all the link MTUs of MAPs 11-14 are 1300 bytes. In passing, it is assumed that in the packet communication system 1 there exists an HA 4 managing global location information of MN 3 but it is located neither on the path A nor on the path B.

The CN 2 is a communication device that transmits and receives data in packet units to and from the MN 3 or the like and is, for example, a personal computer, a telephone, or the like. On the occasion of transmitting data, the CN 2 discovers a Path MTU of a path routed to a destination node and preserves the Path MTU in a storage device (not shown). Then the CN 2 fragments data into packets of packet size equivalent to the preserved Path MTU, and transmits the data in packet units.

In particular, when receiving a BU message with an ICMPPTB message from the mobile node, the CN 2 updates the Path MTU on the basis of the Path MTU indicated by the ICMPPTB message and preserves the updated Path MTU in the storage device (not shown).

Figure 2B:
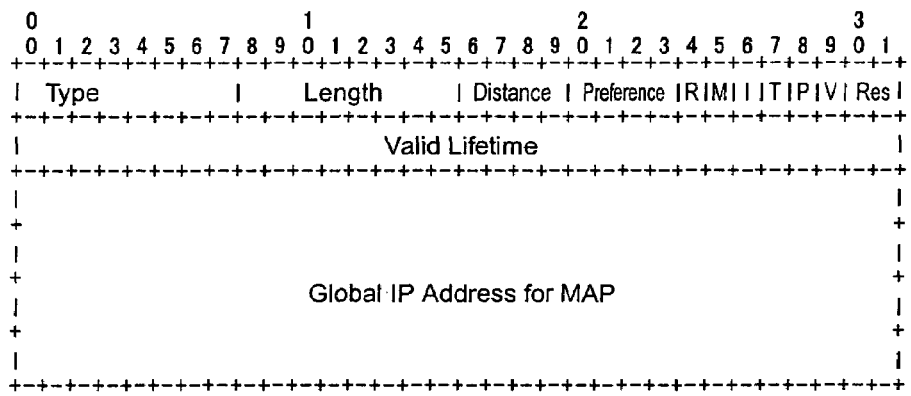
FIG. 2B shows a format of a MAP option added to the router advertisement message for transmission of information about the MAP in FIG. 1.
Figure 3:
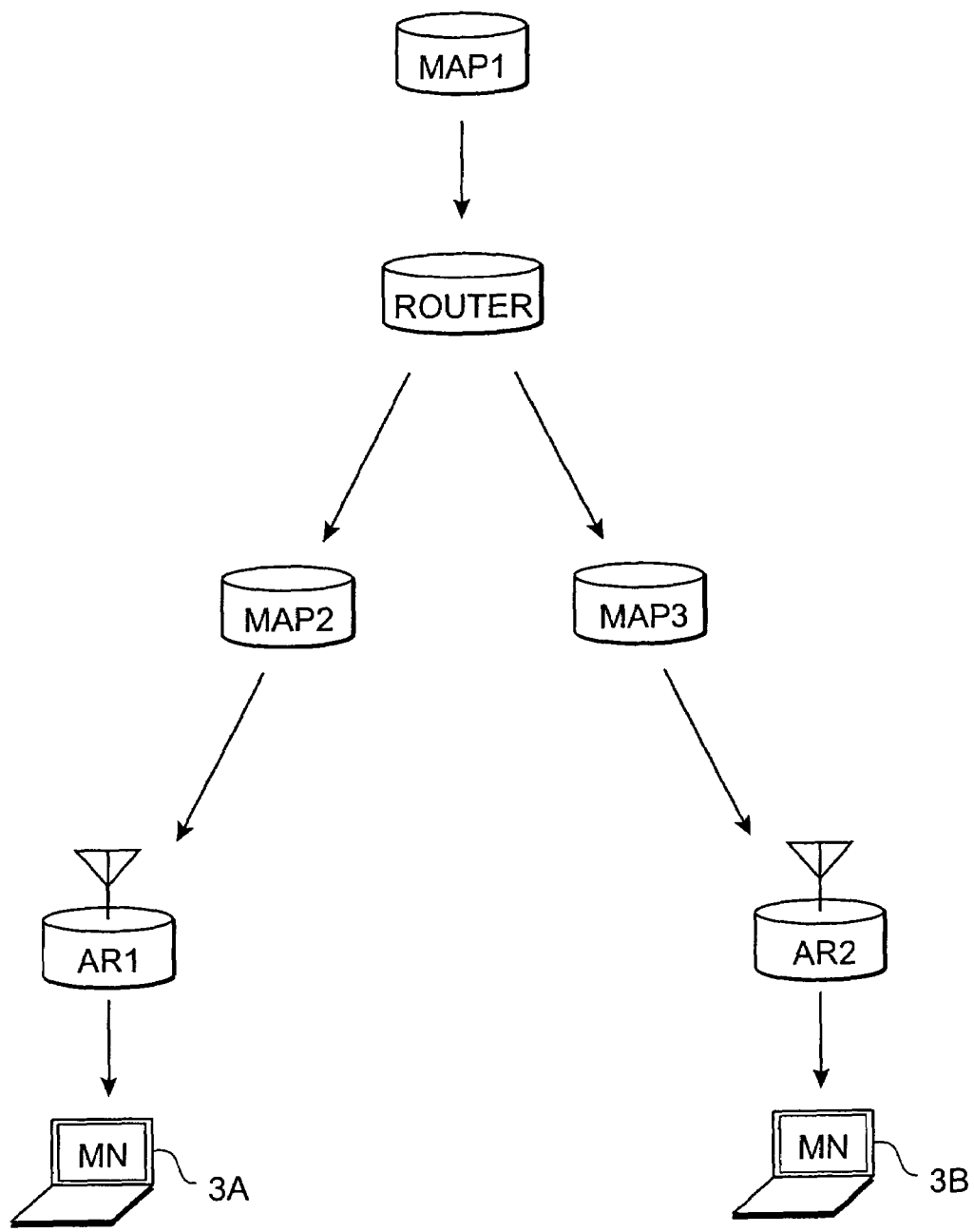
FIG. 3 is an illustration to illustrate the announcement of information about MAPs in the first and second embodiments.

The MAPs 11-14 will be described with reference to FIGS. 2A, 2B and 3. FIG. 2A shows a format of a router advertisement message for transmission of information about the MAP in FIG. 1. FIG. 2B shows a format of a MAP option added to the router advertisement message for transmission of information about the MAP in FIG. 1. FIG. 3 is an illustration for explaining advertisement of MAP information in the first and second embodiments.

The MAPs 11-14 are devices that relay data flowing on the IP network. The MAPs 11-14 manage the local location information of MN 3 and are configured so that, under a situation in which the MN 3 registers its address locally acquired in a control area where the MAPs are installed, when each MAP receives a packet addressed to the MN 3, it forwards the packet to the address of the MN 3 registered in the MAP. On that occasion, an IP header with the source being the MAP and the destination being the address of the MN 3 thus registered is added to the packet having been transported to the MAP.

In order to notify the MN 3 of the information about the MAPs existing on the path, each MAP existing on the IP network including the MAPs 11-14, when receiving a router advertisement message having been transmitted from an upper-layer MAP (in practice, a router connected through a link to the MAP), adds a MAP option of its own to the router advertisement message. For sequential advertisement to a lower-layer MAP, the MAP then transmits the router advertisement message with the MAP option onto a link connected to the router. In the last step, the lowest-layer MAP existing on the path transmits the router advertisement message with MAP options onto a link connected to an AR, and the MN 3 receives the router advertisement message from the AR. Accordingly, the MAPs in the respective layers on the path add their respective MAP options to the router advertisement message, so that the MN 3 receives the router advertisement message with the MAP options cumulatively added by the respective MAPs in all the layers existing on the path. For example, since there exist three MAPs of MAPs 12-14 on the path B, the MN 3 receives the router advertisement message with three MAP options cumulatively added, from the AR 22.

As shown in FIG. 2A, the router advertisement message is the one used in IPv6. The MAP options are of data structure as shown in FIG. 2B, in which a hop count is written as layer information in Distance, a selection priority in Preference, and a global IP address and a subnet prefix in Global IP Address for MAP. The hop count is the number of hops between MN 3 and each MAP. MAPs with the same hop count are in the same layer, and the MAP layer becomes higher with increase in the hop count. The selection priority is a priority for selecting an optimal MAP out of MAPs in the same layer, which is indicated by a positive integer; the smaller the integer, the higher the priority. The global IP address and subnet prefix indicate the location of the MAP on the IP network.

An example of the advertisement of the MAP information will be described referring to FIG. 3. In the example of FIG. 3, MAPs are arranged in two layers: MAP 1 is set in the upper layer; MAP 2 and MAP 3 in the lower layer. A router is connected through a link to MAP 1, AR 1 through a link to MAP 2, and AR 2 through a link to MAP 3. AR 1 is a node to which MN 3A is connected, and AR 2 a node to which MN 3B is connected.

The MAP 1 sends a router advertisement message with a MAP option in which the information about MAP 1 is written, onto the link connected to the router. Receiving the router advertisement message from the MAP 1, the router sends the router advertisement message with the MAP option of MAP 1 onto the link connected to the MAP 2 and onto the link connected to the MAP 3.

Receiving the router advertisement message with the MAP option of MAP 1, the MAP 2 sends the router advertisement message with the MAP options of MAP 1 and MAP 2 onto the link connected to AR 1.

On the other hand, when receiving the router advertisement message with the MAP option of MAP 1, the MAP 3 also sends the router advertisement message with the MAP options of MAP 1 and MAP 3 onto the link connected to AR 2.

Receiving the router advertisement message with the MAP options of MAP 1 and MAP 2, the AR 1 sends the router advertisement message of the MAP options of MAP 1 and MAP 2 onto the link connected to MN 3A. Then the MN 3A receives the router advertisement message and acquires the information about MAP 1 and MAP 2.

On the other hand, when receiving the router advertisement message with the MAP options of MAP 1 and MAP 3, the AR 2 also sends the router advertisement message with the MAP options of MAP 1 and MAP 3 onto the link connected to the MN 3B. Then the MN 3B receives the router advertisement message and acquires the information about MAP 1 and MAP 3.

Figure 4:
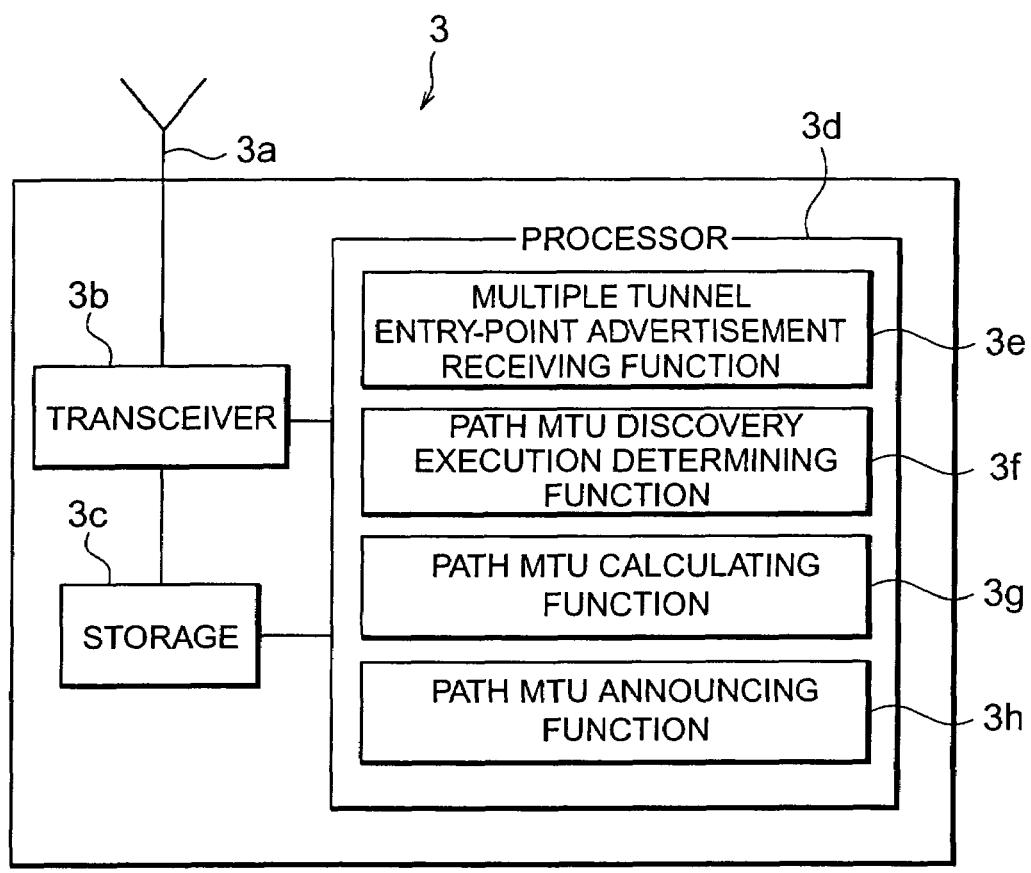
FIG. 4 is an illustration showing the configuration of the mobile node in FIG. 1.
Figure 5:
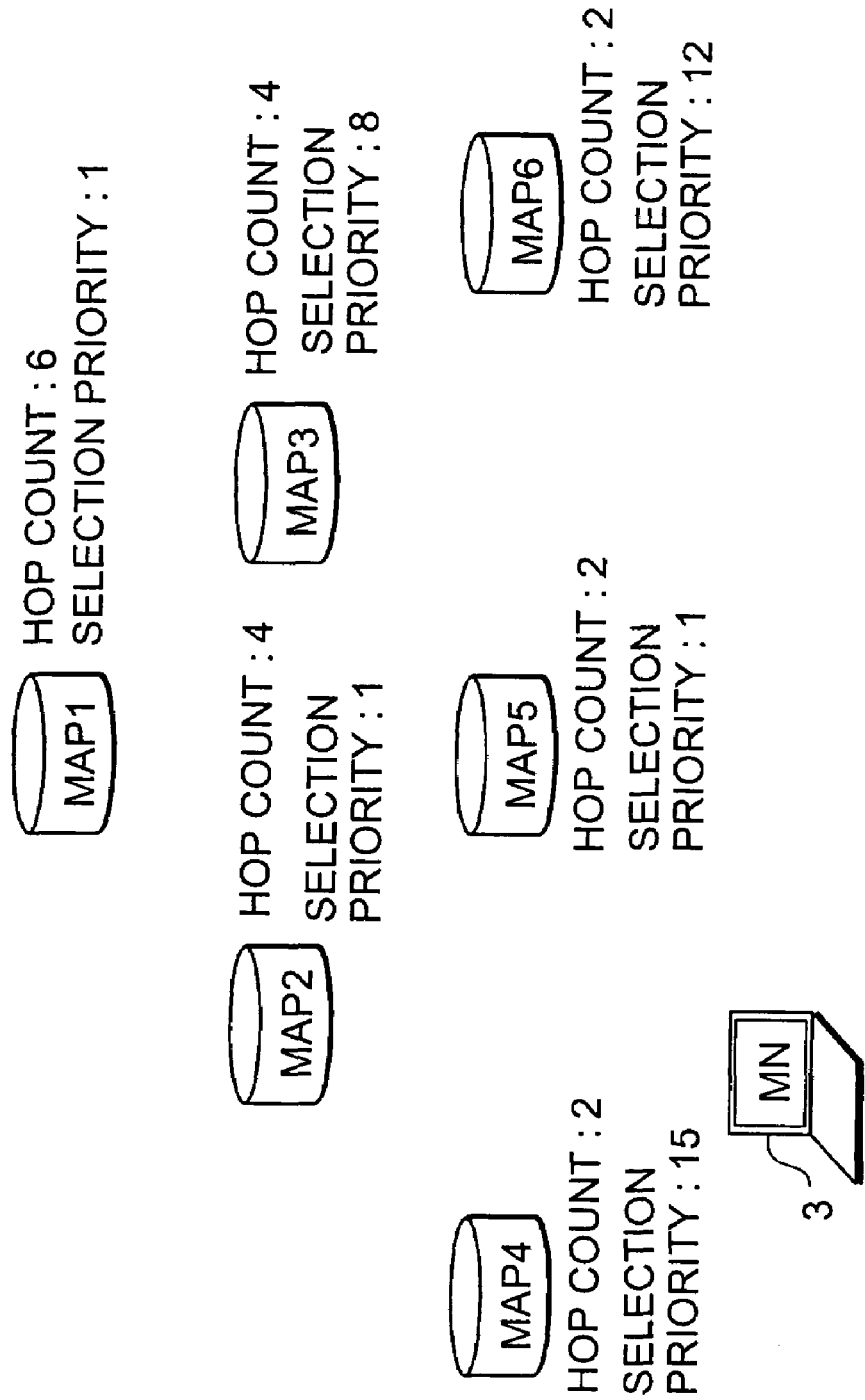
FIG. 5 is an illustration to illustrate selection of MAPs at a multiple tunnel entry-point advertisement receiving function of FIG. 4.

The MN 3 will be described while also referring to FIGS. 4 and 5. FIG. 4 is an illustration showing the configuration of MN. FIG. 5 is an illustration for explaining selection of a MAP in a multiple tunnel entry-point advertisement receiving function.

The MN 3 is a communication device that transmits and receives data in packet units to and from CN 2 or the like and mobile unit that can move in the IP network; for example, it is a mobile computer, a mobile telephone, or the like. When the MN 3 moves during reception of data to update the path to another, it collects information about MAPs (entry points of multiple tunnels) existing on the new path after the update and announces to the correspondent (CN 2) the Path MTU calculated based on the number of MAPs thus collected. For implementing it, the MN 3 is provided with antenna 3*a*, transceiver 3*b*, storage 3*c*, and processor 3*d*. Particularly, the processor 3*d* is comprised of multiple tunnel entry-point advertisement receiving function 3*e*, Path MTU discovery execution determining function 3*f*, Path MTU calculating function 3*g*, and Path MTU announcing function 3*h*. Each of the functions 3*e*-3*h* in the processor 3*d* is implemented by letting a computer execute a dedicated program.

The multiple tunnel entry-point advertisement receiving function 3*e* is a function of, when the movement of MN results in a handoff between ARs as a connected node and a update of the path, receiving the router advertisement message with MAP options through antenna 3*a* and transceiver 3*b* from the AR as a connected node. The multiple tunnel entry-point advertisement receiving function 3*e* then detects the MAPs existing on the path from the correspondent (CN 2), from the MAP options of the respective MAPs. Furthermore, the multiple tunnel entry-point advertisement receiving function 3*e* selects optimal MAPs in respective layers as entry points of multiple tunnels on the path from the correspondent (CN 2), based on the hop counts and selection priorities written in the MAP options of the respective MAPs.

An example of the selection of MAPs in the multiple tunnel entry-point advertisement receiving function 3*e* will be described referring to FIG. 5. In the example of FIG. 5, the multiple tunnel entry-point advertisement receiving function 3*e* detects six MAPs 1-6 existing on the path from the correspondent (CN 2). Suppose MAP 1 has the hop count of 6 and the selection priority of 1. Suppose MAP 2 has the hop count of 4 and the selection priority of 1. Suppose MAP 3 has the hop count of 4 and the selection priority of 8. Suppose MAP 4 has the hop count of 2 and the selection priority of 15. Suppose MAP 5 has the hop count of 2 and the selection priority of 1. Suppose MAP 6 has the hop count of 2 and the selection priority of 12.

When the multiple tunnel entry-point advertisement receiving function 3*e* detects the six MAPs 1-6, it classifies the MAPs into three layers by the hop counts of the respective MAPs, so that MAP 1 with the hop count of 6 is in an upper layer, MAP 2 and MAP 3 with the hop count of 4 are in a middle layer, and MAP 4, MAP 5, and MAP 6 with the hop count of 2 are in a lower layer. Subsequently, the multiple tunnel entry-point advertisement receiving function 3*e* compares the selection priorities of MAPs in each layer to automatically select MAP 1 in the upper layer, select MAP 2 with the selection priority of 1 in the middle layer, and select MAP 5 with the selection priority of 1 in the lower layer. Namely, on the path between MN 3 and correspondent (CN 2), the MAPs are set in the order of MAP 1, MAP 2, and MAP 5 stated from the upper layer.

The Path MTU discovery execution determining function 3*f* compares the number of MAPs existing on the previous path before the handoff preserved in the storage 3*c*, with the number of MAPs selected by the multiple tunnel entry-point advertisement receiving function 3*e* (i.e., the number of MAPs existing on the new path after the handoff). Then the Path MTU discovery execution determining function 3*f* determines that execution of Path MTU discovery is necessary, when the number of MAPs before the update of the path is different from that after the update. When they are equal, it determines that the execution of Path MTU discovery is not necessary.

When the Path MTU discovery execution determining function 3*f* determines that the discovery of Path MTU is necessary, the Path MTU calculating function 3*g* calculates the Path MTU of the new path after the update. The Path MTU calculating function 3*g* calculates the Path MTU according to a calculation equation of (the Path MTU of the path before the update−the size of the IP header added upon one encapsulation at MAPx(the number of MAPs selected by the multiple tunnel entry-point advertisement receiving function 3*e*−the number of MAPs existing on the path before the update)). Namely, this calculation equation is such that when the number of MAPs on the path after the update is greater than that before the update, the Path MTU of the path before the update is decreased by (IP header size×the increased number of MAPs) in order to adapt to the increase of the IP headers due to the increase of MAPs and such that when the number of MAPs on the path after the update is smaller than that before the update, the Path MTU of the path before the update is increased by (IP header size×the decreased number of MAPs) in order to adapt to the decrease of the IP headers due to the decrease of MAPs. The Path MTU of the path before the update and the number of MAPs existing on the path before the update are those preserved in the storage 3*c* and the size of the IP header added upon one encapsulation is the size preliminarily defined.

The Path MTU announcing function 3*h* adds an ICMPPTB message to a BU message and lets the transceiver 3*b* send the BU message through antenna 3*a* to CN 2. On this occasion, the Path MTU announcing function 3*h* writes the Path MTU calculated by the Path MTU calculating function 3*g*, into the ICMPPTB message.

The ICMPPTB message is an error message that is sent when a size of a packet is too big for a node on the path to transport the packet; however, since it is used for advertisement of the Path MTU, it does not have a meaning as an error message herein.

Now let us explain the operation in the case where in the packet communication system 1, during transmission of data on the path A from CN 2 to MN 3, the MN 3 moves to cause a handoff from AR 21 to AR 22 as a connected node and a update of the path to path B.

The description is based on the premise that the CN 2 acquired the Path MTU of 1260 bytes of the path A by the Path MTU discovery and preserves it in the storage (not shown) and the CN 2 is transmitting packets on the basis of the Path MTU. Furthermore, downstream of the MAP 11, packets are transmitted in the packet size resulting from the addition of the IP header size (40 bytes) for the encapsulation at MAP 11 to the Path MTU of 1260 bytes preserved in the CN 2.

The MAP 11 adds a MAP option carrying information as a MAP of the MAP 11 to a router advertisement message to be transmitted for announcing information as a router of the MAP 11 to adjacent nodes, and sends the message to the adjacent nodes. When AR 21 receives the router advertisement message with the MAP option of MAP 11 from the adjacent node, it adds the MAP option of the MAP 11 to a router advertisement message sent by itself, and then sends the message to adjacent nodes. During connection with the AR 21, the MN 3 receives the router advertisement message with the MAP option of MAP 11 from the AR 21 and thereby detects the MAP 11.

The MAP 12 adds a MAP option carrying information as a MAP of the MAP 12 to a router advertisement message to be transmitted for announcing information as a router of the MAP 12 to adjacent nodes, and then sends the message to the adjacent nodes. When the MAP 13 receives the router advertisement message with the MAP option of MAP 12 from the adjacent node, it adds a MAP option of MAP 13 to a router advertisement message sent by itself, and then sends the message to adjacent nodes. When the MAP 14 receives the router advertisement message with the MAP options of MAP 12 and MAP 13 from the adjacent node, it adds a MAP option of MAP 14 to a router advertisement message sent by itself, and then sends the message to adjacent nodes. When the AR 22 receives the router advertisement message with the MAP options of MAP 12, MAP 13, and MAP 14 from the adjacent node, it adds the MAP options of MAP 12, MAP 13, and MAP 14 to a router advertisement message sent by itself, and then sends the message to adjacent nodes.

Figure 6:
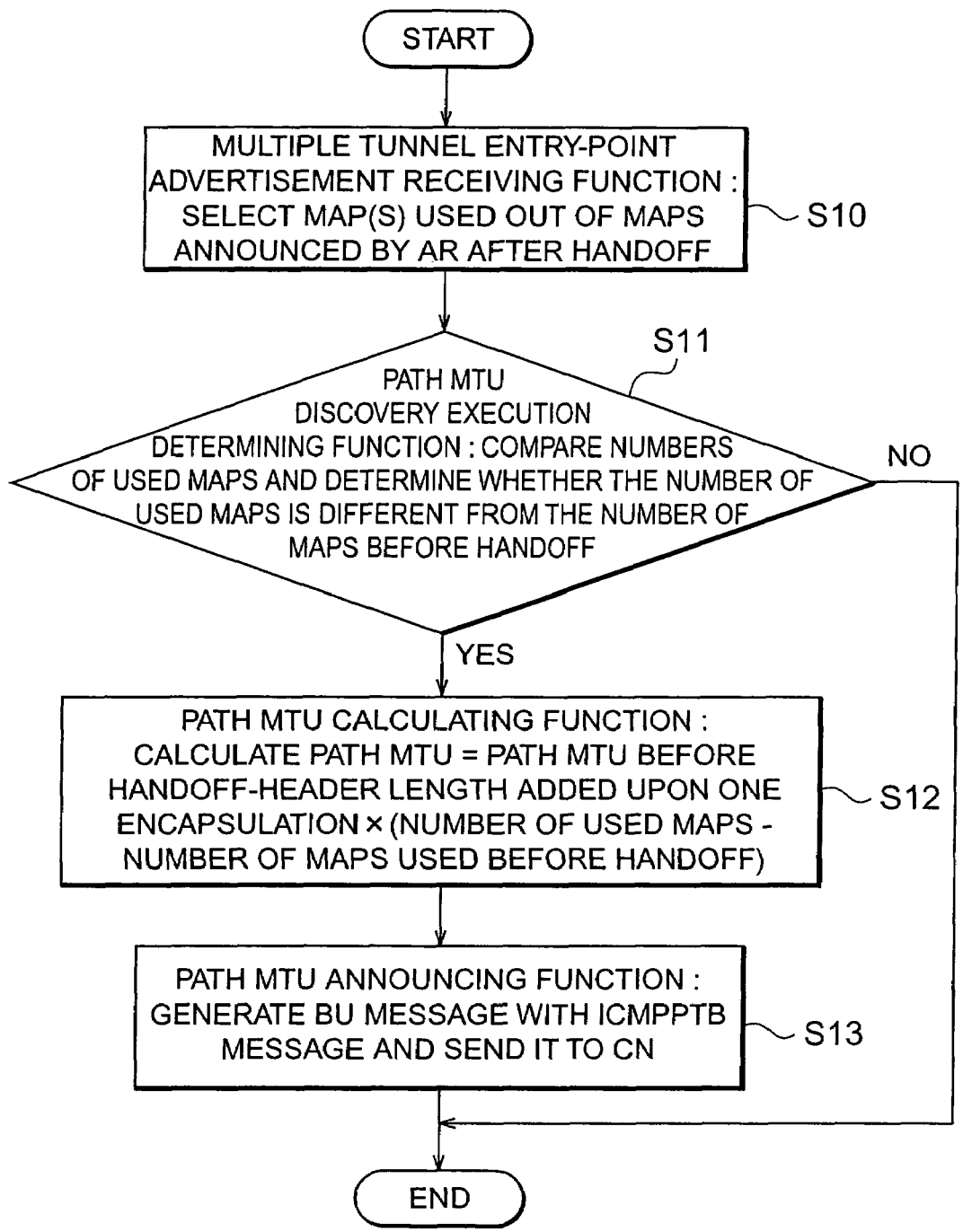
FIG. 6 is a flowchart of the Path MTU discovery method at the mobile node in the first embodiment.

The operation in the MN 3 will be described along the flowchart of FIG. 6. FIG. 6 is the flowchart of the Path MTU discovery method in MN according to the first embodiment.

When the MN 3 updates its connected node from AR 21 to AR 22, it receives the router advertisement message with MAP options from AR 22. Then the MN 3 selects the MAPs 12-14 existing on the path B, based on the information about the MAPs written in the MAP options of the respective MAPs (S10).

Subsequently, the MN 3 determines whether the number of MAPs on the path A before the handoff is different from the number of MAPs existing on the path B after the handoff (S11). When they are different, the MN 3 determines that the execution of Path MTU discovery is necessary, and then transfers to the process of step S12 (S11). When they are equal, the MN 3 determines that the execution of Path MTU discovery is not necessary, and then terminates the processing (S11). In this example, since the number of MAPs on the path B after the handoff, 3, is different from the number of MAPs on the path A before the handoff, 1, the MN 3 determines that the execution of Path MTU discovery is necessary.

When the execution of Path MTU discovery is determined to be necessary, the MN 3 calculates the MTU of the path B according to (the MTU of the path A before the handoff–the IP header size added upon one encapsulation at MAP×(the number of MAPs selected in step S10–the number of MAPs existing on the path A before the handoff)) (S12). On this occasion, the MN 3 performs the calculation of (the MTU of path A: 1260 bytes–the IP header size: 40 bytes×(the number of MAPs selected in step S10: 3–the number of MAPs existing on the path A: 1)) to obtain 1180 bytes as the MTU of the path B.

In the last step, the MN 3 generates a BU message with an ICMPPTB message indicating the calculated Path MTU, sends the BU message to the CN 2, and terminates the processing (S13). On this occasion, the Path MTU of 1180 bytes is indicated by the ICMPPTB message in the MN 3.

The operation in the CN 2 will be described. When the CN 2 receives the BU message with the ICMPPTB message from the MN 3, it updates the preserved Path MTU to the Path MTU indicated in the ICMPPTB message, and preserves it in the storage (not shown). Then the CN 2 changes the transmitted packet size on the basis of the updated Path MTU and then starts transmitting packets to the MN 3. Since the update from path A to path B increases the number of headers for encapsulations added to the packet finally received by MN 3, from 1 to 3, the CN 2 transmits packets of the maximum packet size under the condition that packets can be delivered to MN 3, without a response of ICMP error even after the addition of three headers. For this reason, even with the increase of two MAPs, the CN 2 does not have to carry out the Path MTU discovery operations corresponding thereto.

In the packet communication system 1 according to the first embodiment, the MN 3 checks the number of MAPs existing on the path from the correspondent (CN 2), calculates the Path MTU, depending upon the number of MAPs, and announces the Path MTU to the CN 2, so that the CN 2 can utilize the Path MTU announced by the MN 3 even in the case where there exist a plurality of MAPs on the path, whereby the number of MTU discovery operations can be reduced. Particularly, in the example of the first embodiment, even if the number of MAPs existing on the path increases because of movement of the MN 3 to update the path, the CN 2 does not have to carry out the Path MTU discoveries corresponding to the increased number of MAPs and can quickly update the Path MTU on the basis of the Path MTU announced by the MN 3. Furthermore, since the CN 2 can quickly update the Path MTU, it can transmit data in the optimal packet size and the transmission efficiency on the network is also increased.

In the packet communication system 1 according to the first embodiment, each MAP adds a MAP option containing information about the MAP itself to the router advertisement message having been transmitted from an upper layer, and sends the message sequentially to a lower layer; therefore, with reference to the MAP options cumulatively added to the router advertisement message, the MN 3 can securely detect the MAPs on the path and readily select the MAPs on the path.

Figure 7:
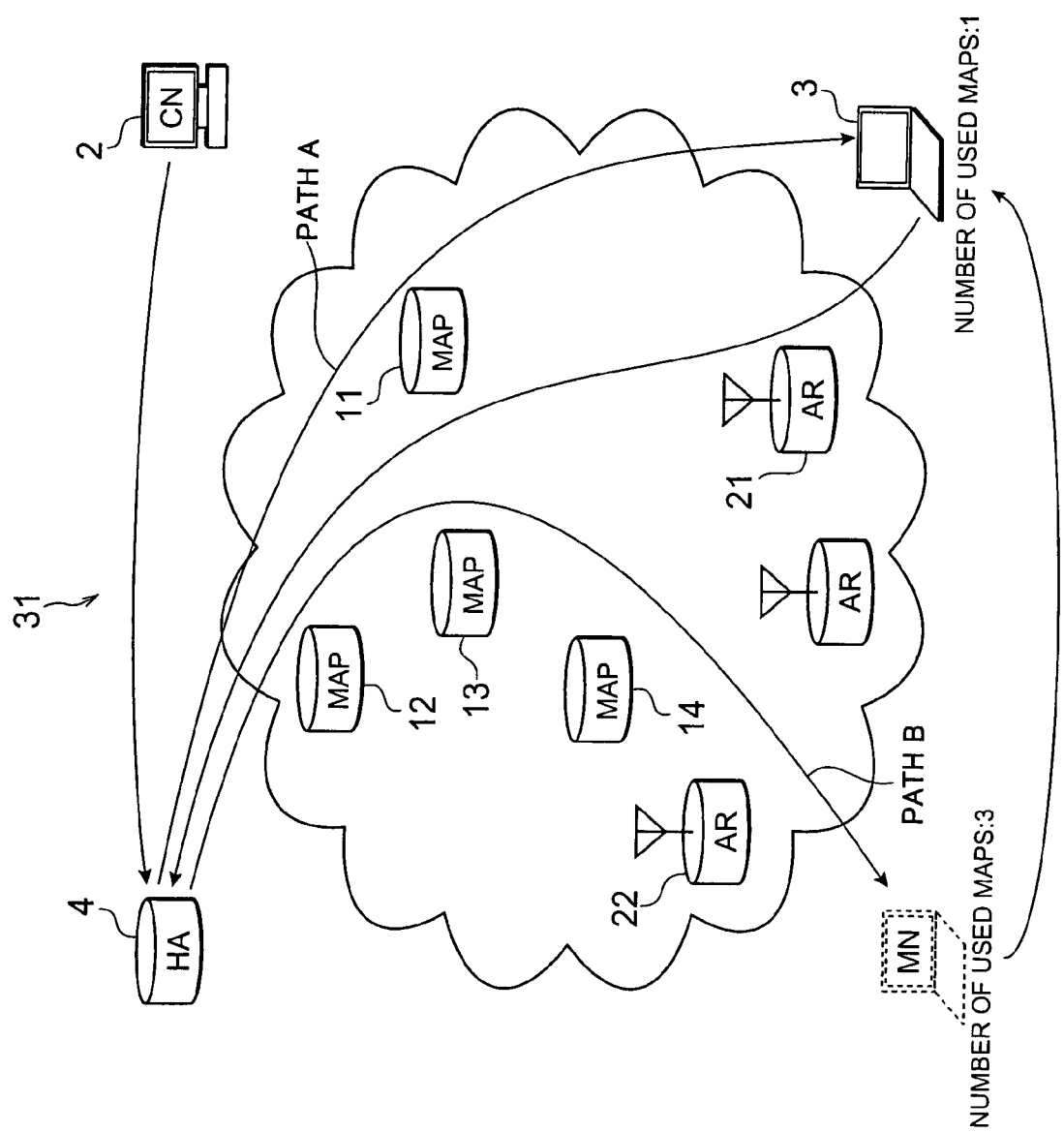
FIG. 7 is an illustration showing the whole configuration of the packet communication system according to the second embodiment.

The second embodiment will be described next. The whole configuration of packet communication system 31 in the second embodiment will be described with reference to FIG. 7. FIG. 7 is an illustration showing the whole configuration of the packet communication system in the second embodiment. In the second embodiment, components similar to those in the packet communication system 1 of the first embodiment will be denoted by the same reference symbols, without redundant description thereof.

The packet communication system 31 is configured on the IP network consisting of a great number of nodes and links, as the packet communication system 1 in the first embodiment was. It is assumed that in the packet communication system 31, during transmission of data on the path B from CN 2 to MN 3, the MN 3 moved to cause a handoff from AR 22 to AR 21 as a connected node and a update of the path to path A. It is also assumed that there existed three MAPs 12-14 and an HA 4 on path B from CN 2 to MN 3 and the Path MTU of the path B was 1260 bytes. Therefore, the CN 2 preserves 1260 bytes as the Path MTU and transmitted packets in units of 1260 bytes to the MN 3. Furthermore, packets are transmitted in the packet size resulting from the addition of the IP header size (40 bytes) for an encapsulation at HA 4 to the Path MTU of 1260 bytes preserved in the CN 2, downstream of the HA 4; packets are transmitted in the packet size resulting from the addition of the IP header size (40 bytes) for an encapsulation at MAP 12 to the packet size of 1300 bytes having been transported from the HA 4, downstream of the MAP 12; packets are transmitted in the packet size resulting from the addition of the IP header size (40 bytes) for an encapsulation at MAP 13 to the packet size of 1340 bytes having been transported from the MAP 12, downstream of the MAP 13; packets are transmitted in the packet size resulting from the addition of the IP header size (40 bytes) for an encapsulation at MAP 14 to the packet size of 1380 bytes having been transported from the MAP 13, downstream of the MAP 14. On the other hand, there exist one MAP 11 and the HA 4 on the path A from CN 2 to MN 3. The link MTUs of the MAPs 11-14 are assumed all to be 1420 bytes.

The CN 2 has the configuration and operation similar to those in the first embodiment, but it also performs the following operation in particular in the second embodiment. When the CN 2 receives the ICMPPTB message from HA 4 after transmission of a packet addressed to the MN 3, it performs the operation similar to that upon receipt of the BU message with the ICMPPTB message from the MN 3 in the first embodiment.

The MN 3 has the configuration and operation similar to those in the first embodiment, but it also performs the following operation in particular in the second embodiment. When there also exists the HA 4 on the path, the Path MTU announcing function 3h of MN 3 (cf. FIG. 4) transmits the BU message with the ICMPPTB message to the HA 4.

The HA 4 will be described while also referring to FIG. 8.

Figure 8:
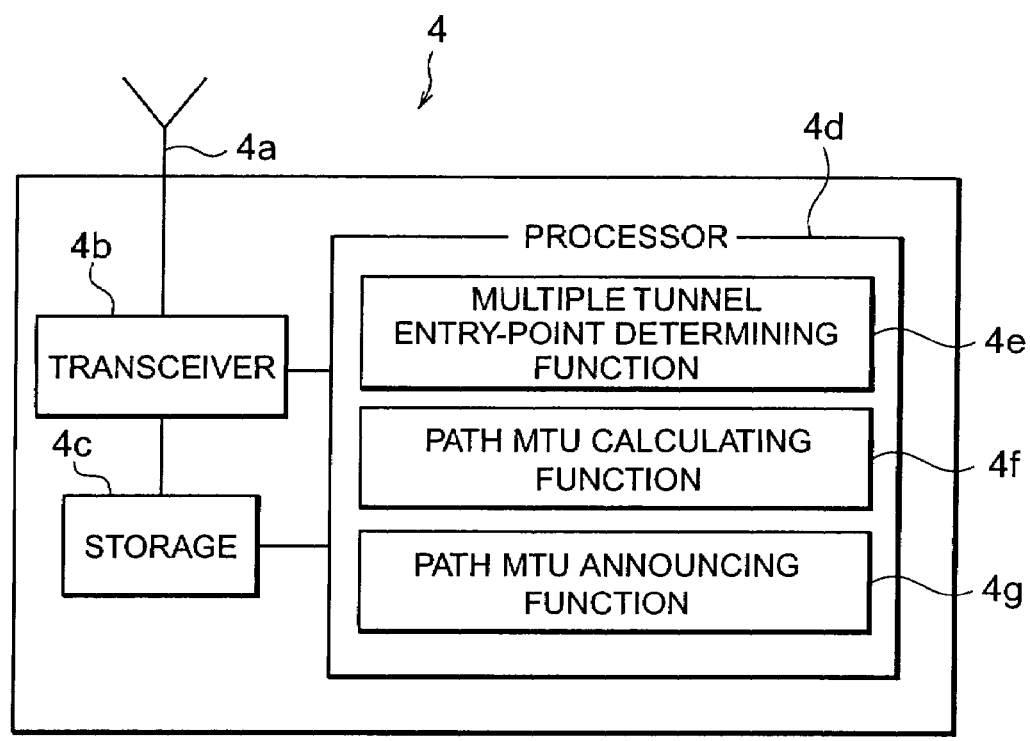
FIG. 8 is an illustration showing the configuration of the home agent in FIG. 7.

FIG. 8 is an illustration showing the configuration of HA.

The HA 4 is a device that manages the global location information of MN 3 and is, for example, a router. The HA 4 is configured so that when HA 4 receives a packet addressed to MN 3 during a period in which the MN 3 stays away from its home network under the control of HA 4 and is connected to a foreign network, the HA 4 forwards the packet to an address presently temporarily acquired by the MN 3 and registered in the HA 4. On that occasion, the HA 4 adds an IP header with the source being HA 4 and the destination being the address presently temporarily acquired by the MN 3, to the packet having been transported thereto. When the HA 4 receives the BU message with the ICMPPTB message from the MN 3, it judges that the node HA itself is an entry point of multiple tunnels, recalculates the Path MTU, and then announces the Path MTU to the CN. For implementing it, the HA 4 is provided with antenna 4a, transceiver 4b, storage 4c, and processor 4d. Particularly, the processor 4d is comprised of multiple tunnel entry-point determining function 4e, Path MTU calculating function 4f, and Path MTU announcing function 4g. Each of the functions 4e-4g in the processor 4d is implemented by letting a computer execute a dedicated program.

The multiple tunnel entry-point determining function 4e is a function of, when receiving the BU message with the ICMPPTB message through antenna 4a and transceiver 4b from MN 3, determining that the node itself (HA 4) is an entry point of multiple tunnels existing on the path between CN 2 and MN 3. The Path MTU calculated in the MN 3 is indicated in the ICMPPTB message.

When the multiple tunnel entry-point determining function 4e determines that the node itself is an entry point of multiple tunnels existing on the path between CN 2 and MN 3, the Path MTU calculating function 4f calculates the Path MTU on the basis of the Path MTU indicated in the ICMPPTB message and presence/absence of an encapsulation at the node itself through the update of the path (i.e., increase or decrease in the number of entry points of multiple tunnels due to an encapsulation at HA 4 through the update of the path).

On this occasion, the Path MTU calculating function 4f determines whether the movement of the MN 3 is a movement from the home network (the network under control of the HA 4) to a foreign network (a network being not under control of HA 4), a movement from a foreign network to the home network, or a movement from a foreign network to another foreign network. This determination is carried out by using the contents registered in a binding cache that is stored in the storage 4c to manage the movement of MN 3. With a movement of MN 3 from the home network to a foreign network, a new binding of MN 3 is registered in the binding cache. Accordingly, when a new binding of MN 3 is registered, it is determined that MN 3 has moved from the home network to a foreign network. With a movement of MN 3 from a foreign network to the home network, the binding of MN 3 registered in the binding cache is deleted. Accordingly, when the binding of MN 3 is deleted, it is determined that the MN 3 has moved from a foreign network to the home network. With a movement of MN 3 from a foreign network to another foreign network, the binding of MN 3 registered in the binding cache is updated to another. Accordingly, when the binding of MN 3 is updated, it is determined that MN 3 has moved from a foreign network to another foreign network.

When it is determined that the MN 3 has moved from the home network to a foreign network, the Path MTU calculating function 4f subtracts the IP header size added upon an encapsulation from the Path MTU announced by the MN 3, and defines the result of the subtraction as a Path MTU. When it is determined that the MN 3 has moved from a foreign network to the home network, the Path MTU calculating function 4f adds the IP header size added upon an encapsulation to the Path MTU announced by the MN 3, and defines the result of the addition as a Path MTU. When it is determined that the MN 3 has moved from a foreign network to another foreign network, the Path MTU calculating function 4f defines the Path MTU announced by the MN 3, as a Path MTU as it is.

In passing, in the case of the migration of MN 3 from the home network to a foreign network, the HA 4 performs the encapsulation on the path after the handoff to add the IP header to a packet, and thus the IP header size is subtracted from the Path MTU. In the case of the migration of MN 3 from a foreign network to the home network, the HA 4 performed the encapsulation on the path before the handoff to add the IP header to a packet, and thus the IP header size is added to the Path MTU. In the case of the migration of MN 3 from a foreign network to another foreign network, the HA 4 performs the encapsulation on the both paths before and after the handoff, and thus no IP header size is added to or subtracted from the Path MTU.

When the Path MTU announcing function 4g receives a packet addressed to MN 3 under a situation in which the Path MTU calculating function 4f has calculated the Path MTU, it discards the packet and lets the transceiver 4b send the ICMPPTB message through antenna 4a to CN 2. On this occasion, the Path MTU announcing function 4g writes the Path MTU calculated by the Path MTU calculating function 4f, into the ICMPPTB message.

Now let us explain the operation in the case where in the packet communication system 31, the MN 3 moves during transmission of data on the path B from CN 2 to MN 3 to cause a handoff from AR 22 to AR 21 as a connected node and a update of the path to path A.

The description is based on the premise that the CN 2 determined the Path MTU of the path B to be 1260 bytes by the Path MTU discovery, preserves it in the storage (not shown), and is transmitting packets on the basis of the Path MTU. Furthermore, packets are transmitted in the packet size resulting from the addition of the IP header size (40 bytes) for an encapsulation at HA 4 to the Path MTU of 1260 bytes preserved by the CN 2, downstream of HA 4; packets are transmitted in the packet size resulting from the addition of the IP header size (40 bytes) for an encapsulation at MAP 12 to the packet size of 1300 bytes having been transported from HA 4, downstream of the MAP 12; packets are transmitted in the packet size resulting from the addition of the IP header size (40 bytes) for an encapsulation at MAP 13 to the packet size of 1340 bytes having been transported from the MAP 12, downstream of the MAP 13; packets are transmitted in the packet size resulting from the addition of the IP header size (40 bytes) for an encapsulation at MAP 14 to the packet size of 1380 bytes having been transported from the MAP 13, downstream of the MAP 14.

The MAP 12 adds the MAP option carrying information as a MAP of MAP 12 to the router advertisement message to be sent for announcing information as a router of MAP 12 to adjacent nodes, and sends the message to the adjacent nodes. When receiving the router advertisement message with the MAP option of MAP 12 from the adjacent node, the MAP 13 adds the MAP option of MAP 13 to the router advertisement message sent by itself, and sends the message to adjacent nodes. When receiving the router advertisement message with the MAP options of MAP 12 and MAP 13 from the adjacent node, the MAP 14 adds the MAP option of MAP 14 to the router advertisement message sent by itself, and then sends the message to adjacent nodes. When receiving the router advertisement message with the MAP options of MAP 12, MAP 13, and MAP 14 from the adjacent node, the AR 22 adds the MAP options of MAP 12, MAP 13, and MAP 14 to the router advertisement message sent by itself, and then sends the message to adjacent nodes. While the MN 3 is connected to the AR 22, it receives the router advertisement message with the MAP options of MAP 12, MAP 13, and MAP 14 sent from the AR 22, thereby detecting the MAP 12, MAP 13, and MAP 14.

The MAP 11 adds the MAP option carrying information as a MAP of MAP 11 to the router advertisement message to be sent for announcing information as a router of MAP 11 to adjacent nodes, and sends the message to adjacent nodes. When receiving the router advertisement message with the MAP option of MAP 11 from the adjacent node, the AR 21 adds the MAP option of MAP 11 to the router advertisement message sent by itself, and then sends the message to adjacent nodes.

Figure 9:
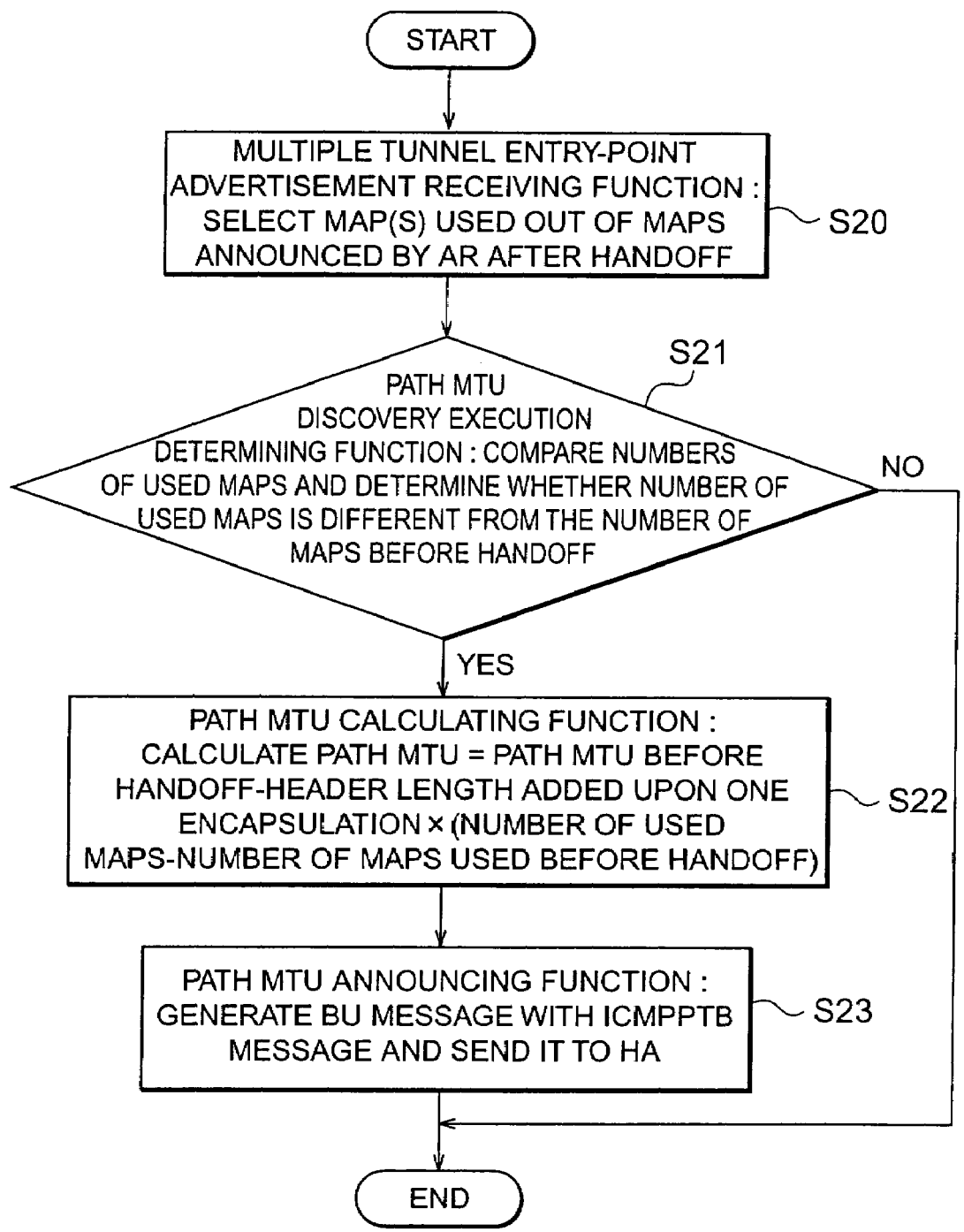
FIG. 9 is a flowchart of the Path MTU discovery method at the mobile node in the second embodiment.

The operation in MN 3 will be described along the flowchart of FIG. 9. FIG. 9 is the flowchart of the Path MTU discovery method in MN according to the second embodiment.

After a handoff from AR 22 to AR 21 as a connected node, the MN 3 receives the router advertisement message with MAP options from AR 21. Then the MN 3 selects the MAP 11 existing on the path A, based on the information about MAPs written in the MAP options of the respective MAPs (S20).

Subsequently, the MN 3 determines whether the number of MAPs on the path B before the handoff is different from the number of MAPs existing on the path A after the handoff (S21). When they are different, the MN 3 determines that the execution of Path MTU discovery is necessary, and then transfers to the process of step S22 (S21). When they are equal, the MN 3 determines that the execution of Path MTU discovery is not necessary, and terminates the processing (S21). In this example, since the number of MAPs on the path B before the handoff, 3, is different from the number of MAPs on the path A after the handoff, 1, the MN 3 determines that the execution of Path MTU discovery is necessary.

When the execution of Path MTU discovery is determined to be necessary, the MN 3 calculates the MTU of path A according to (the MTU of the path B before the handoff–the IP header size added upon one encapsulation×(the number of MAPs selected in step S20–the number of MAPs existing on the path B before the handoff)) (S22). On this occasion, the MN 3 performs the calculation of (the MTU of path B: 1260 bytes–the IP header size: 40 bytes×(the number of MAPs selected in step S20: 1–the number of MAPs existing on the path B: 3)) to obtain 1340 bytes as the MTU of the path A.

In the last step, the MN 3 generates the BU message with the ICMPPTB message indicating the calculated Path MTU, sends the BU message to HA 4, and terminates the processing (S23). On this occasion, the Path MTU of 1340 bytes is indicated as the ICMPPTB message in the MN 3.

Figure 10:
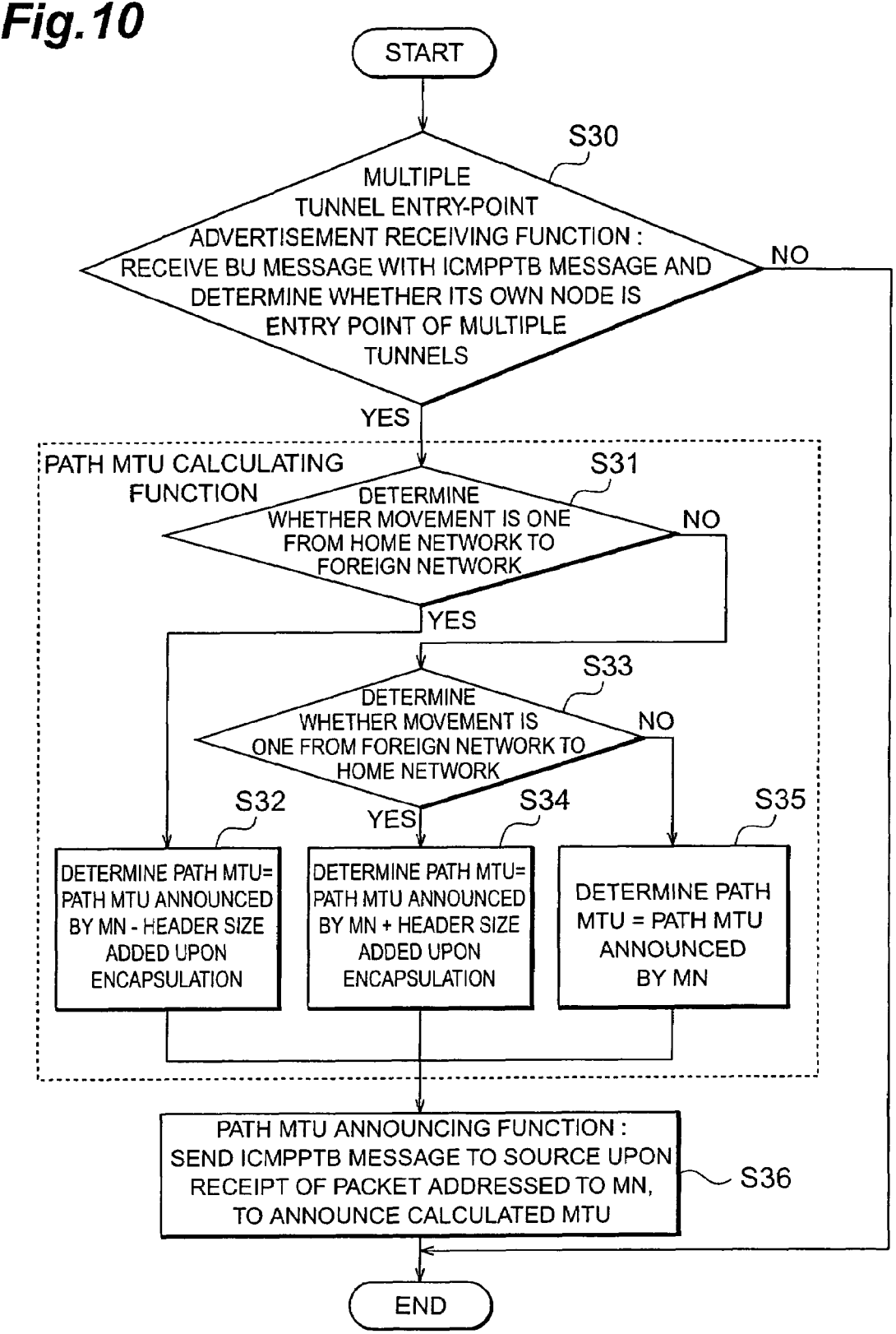
FIG. 10 is a flowchart of the Path MTU discovery method at the home agent in the second embodiment.

The operation in HA 4 will be described along the flowchart of FIG. 10. FIG. 10 is the flowchart of the Path MTU discovery method in HA according to the second embodiment.

When receiving the BU message from MN 3, the HA 4 determines whether the BU message includes the ICMPPTB message (S30). When the ICMPPTB message is attached, the HA 4 determines that the HA 4 itself is an entry point of multiple tunnels, and transfers to the process of step S31 to calculate the Path MTU (S30). When no ICMPPTB message is added, the HA 4 determines that HA 4 itself is not an entry point of multiple tunnels, and then terminates the processing (S30).

When HA 4 itself is determined to be an entry point of multiple tunnels, the HA 4 determines whether the movement of MN 3 is a movement from the home network to a foreign network (S31).

When the movement is determined as one from the home network to a foreign network, the HA 4 subtracts the IP header size added upon an encapsulation, from the Path MTU announced by the MN 3, to obtain a new Path MTU (S32).

On the other hand, when it is determined that the movement is not one from the home network to a foreign network, the HA 4 determines whether the movement of MN 3 is a movement from a foreign network to the home network (S33).

When the movement is determined as one from a foreign network to the home network, the HA 4 adds the IP header size added upon an encapsulation, to the Path MTU announced by the MN 3, to obtain a new Path MTU (S34).

On the other hand, when it is determined that the movement is not one from a foreign network to the home network (i.e., when the movement is one from a foreign network to another foreign network), the HA 4 defines the Path MTU announced by the MN 3, as a Path MTU as it is (S35).

In the last step, the HA 4 generates the ICMPPTB message indicating the calculated Path MTU. When receiving a packet addressed to MN 3 from CN 2, the HA 4 discards the packet, sends the generated ICMPPTB message to the CN 2, and terminates the processing (S36). In the example shown in FIG. 7, the MN 3 makes the movement from a foreign network to another foreign network, and the Path MTU of 1340 bytes is indicated as the ICMPPTB message in HA 4.

The operation in CN 2 will be described. When the CN 2 receives the ICMPPTB message from the HA 4 after transmission of a packet destined for MN 3, it updates the pre-served Path MTU to the Path MTU indicated in the ICMPPTB message and preserves it in the storage (not shown). Then the CN 2 changes the transmitted packet size on the basis of the updated Path MTU and sends packets to MN 3. On this occasion, the CN 2 updates the Path MTU to the Path MTU of 1340 bytes announced by the MN 3, and sends packets in units of 1340 bytes. Accordingly, the number of MAPs is decreased by two after the update from the path B to the path A, and by subtracting the IP header size (40 bytes)× 2=80 bytes for encapsulations at the two MAPs, we obtain the packet size of 1260 bytes (equivalent to the Path MTU on the path B). Namely, the CN 2 is adaptable to the increase of the Path MTU due to the decrease of MAPs, without execution of rediscovery of the Path MTU. For this reason, packets are transmitted in the packet size of 1380 bytes resulting from the addition of the IP header size (40 bytes) for the encapsulation at HA 4 to the Path MTU of 1340 bytes updated at CN 2, downstream of the HA 4; packets are transmitted in the packet size of 1420 bytes resulting from the addition of the IP header size (40 bytes) for the encapsulation at MAP 11 to the packet size of 1380 bytes having been transported from HA 4, downstream of the MAP 11; the packet size of 1420 bytes is the same size as the link MTU Of the MAP 11 of 1420 bytes. Accordingly, without need for waiting for ten minutes before execution of rediscovery of Path MTU, packets are transmitted in the packet size according to the increased Path MTU and thus good transmission efficiency is achieved on the network.

In addition to the effects in the first embodiment, the second embodiment presents the following effect: even in the case where the HA 4 exists on the path between CN 2 and MN 3, the Path MTU is recalculated in consideration of the increase or decrease of the IP header size due to the encapsulation at HA 4 as well and thus the CN 2 does not have to perform the discovery of the Path MTU according to the existence of HA 4. Particularly, in the example of the second embodiment, the CN 2 can quickly update the Path MTU by the announced Path MTU against the practical increase of the Path MTU due to decrease of MAPs upon the update of the path in conjunction with the movement of MN 3. For this reason, data can be transmitted in the optimal packet size, and the transmission efficiency is raised on the network.

Figure 11:
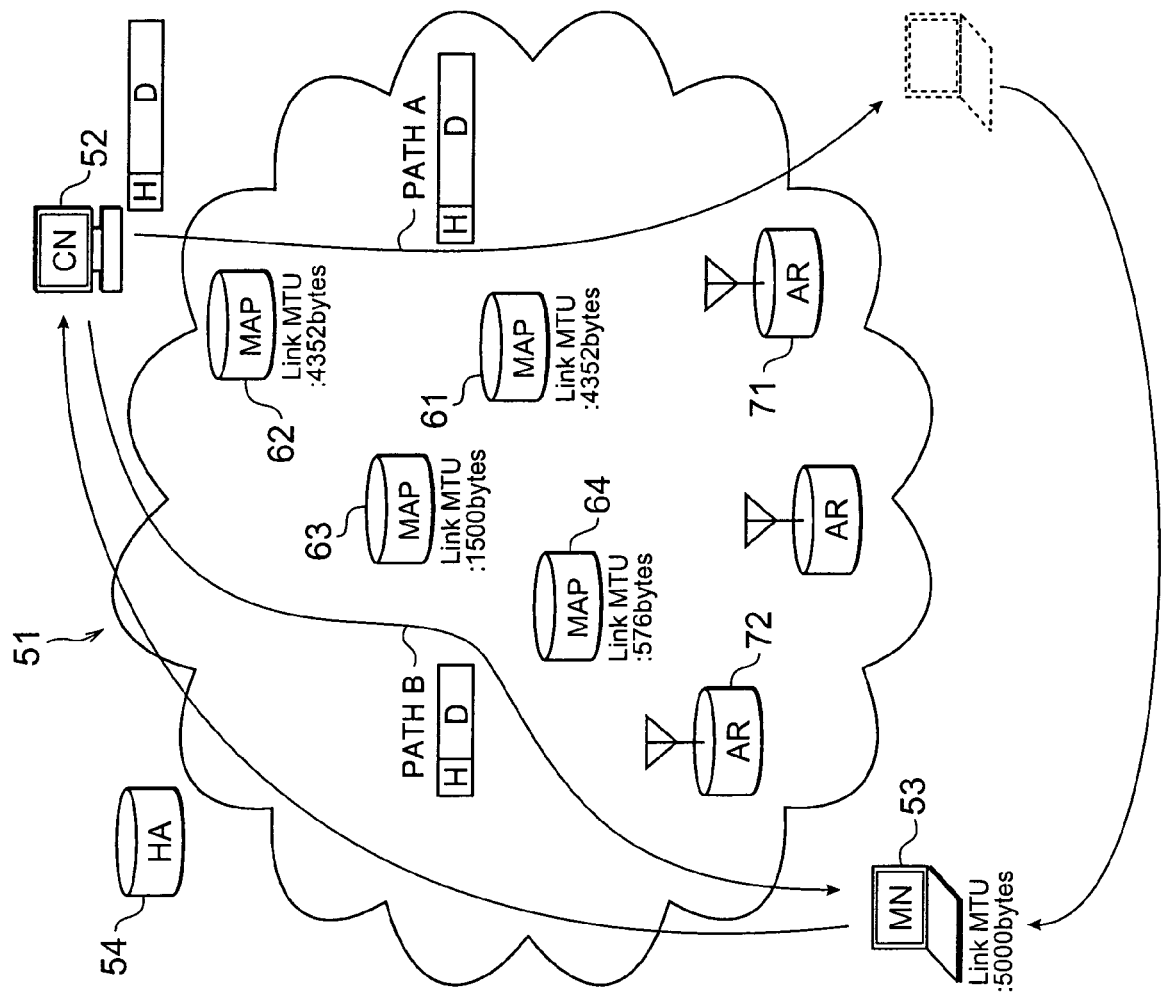
FIG. 11 is an illustration showing the whole configuration of the packet communication system according to the third embodiment.

The third embodiment will be described below. The whole configuration of packet communication system 51 according to the third embodiment will be described with reference to FIG. 11. FIG. 11 is an illustration showing the whole configuration of the packet communication system in the third embodiment.

The packet communication system 51 is configured on the IP network consisting of a great number of nodes and links. The nodes include various computers, stationary telephones, mobile telephones, relay devices such as routers for relaying communication between these devices, and so on. The links interconnect the nodes to each other and include, for example, public telephone lines, Ethernet, FDDI, ATM, and so on.

In the packet communication system 51, during transmission of data on the path A from CN 52 to MN 53, the MN 53 moved to cause a handoff from AR 71 to AR 72 as a connected node and a update of the path to the path B. On this occasion, there existed one MAP 61 on the path A from CN 52 to MN 53 and the Path MTU of the path A was the link MTU of 4352 bytes of the link connected to the MAP 61. Therefore, the CN 52 preserves 4352 bytes as the Path MTU and transmitted packets in the packet size of 4352 bytes to MN 53. On the other hand, there exist three MAPs 62, 63, and 64 on the path B from CN 52 to MN 53, the link MTU of MAP 62 is 4352 bytes, the link MTU of MAP 63 1500 bytes, the link MTU of MAP 64 576 bytes, and the link MTU of MN 53 5000 bytes. In passing, there exists the HA 54 managing the global location information of MN 53 in the packet communication system 51, and it is assumed that the HA 54 is located neither on the path A nor on the path B.

The CN 52 is a communication device that transmits and receives data in packet units to and from MN 53 or the like and is, for example, a personal computer, a telephone, or the like. On the occasion of transmitting data, the CN 52 discovers the Path MTU of the path routed to the destination node and preserves the Path MTU in a storage (not shown). Then the CN 52 fragments data into packets of packet size equal to the Path MTU preserved thereby, and transmits the data in packet units.

Particularly, when receiving the BU message with the ICMPPTB message from the destination node as a destination of data, such as MN 53, the CN 52 updates the preserved Path MTU to the Path MTU indicated in the ICMPPTB message, and preserves the updated Path MTU in the storage.

Figure 12:
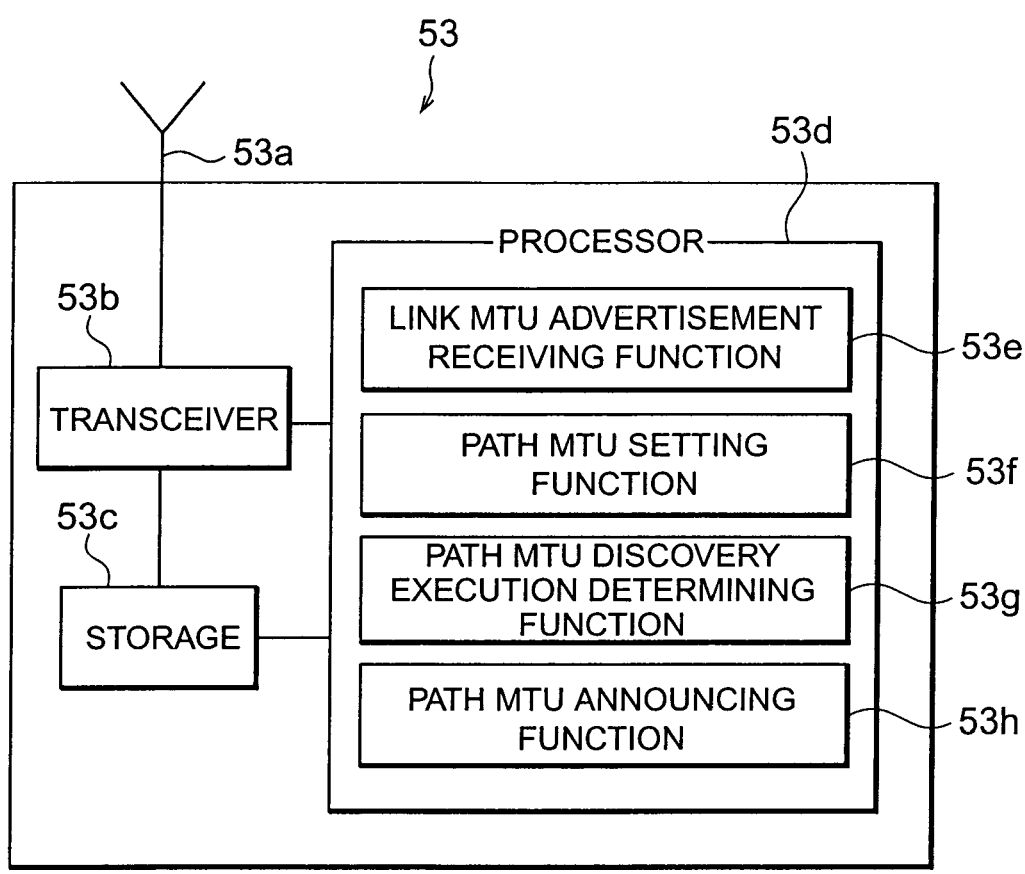
FIG. 12 is an illustration showing the configuration of the mobile node in FIG. 11.
Figure 13:
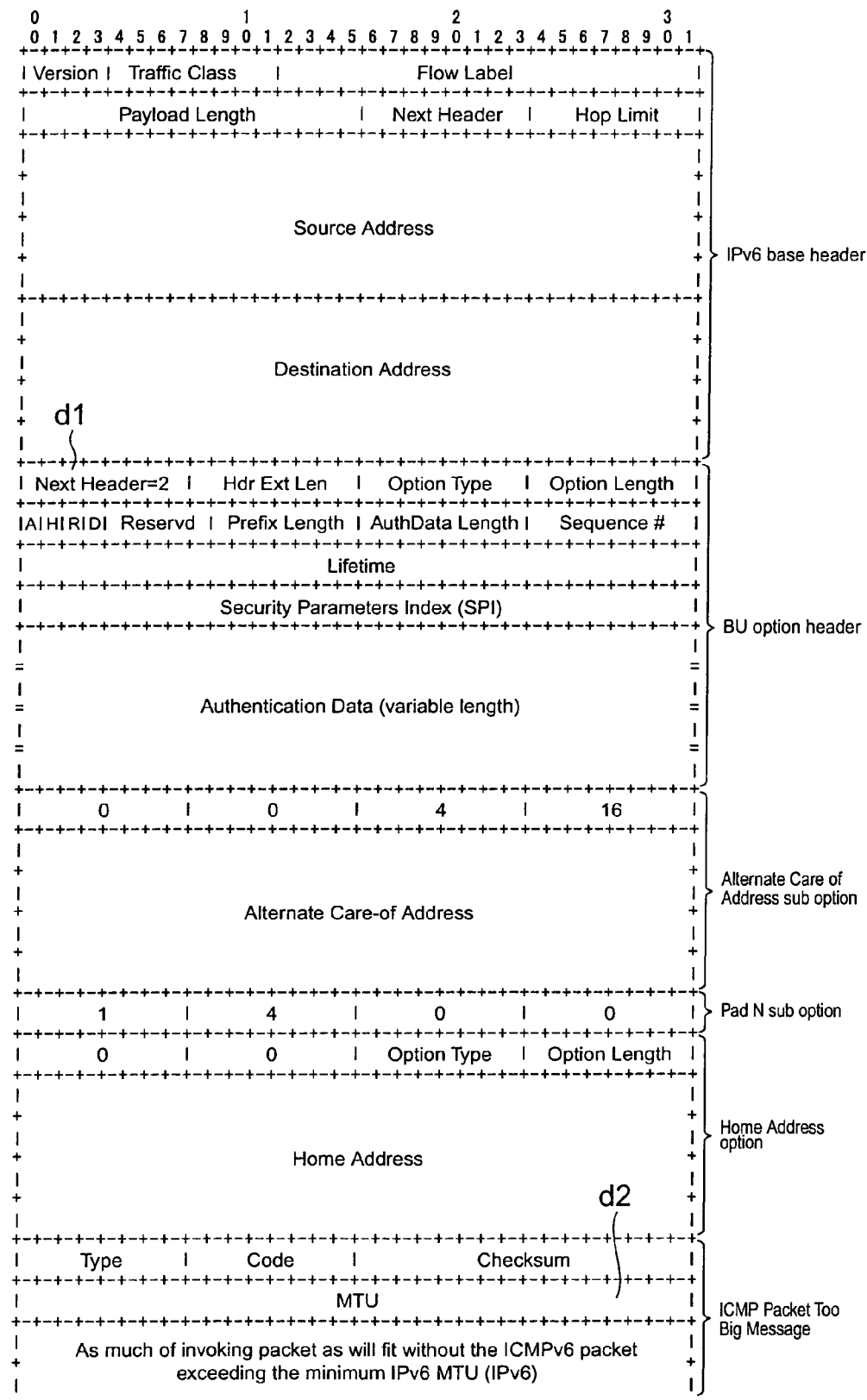
FIG. 13 shows a format of a BU message with an ICMPPTB message transmitted from the mobile node in FIG. 11.

The MN 53 will be described while also referring to FIGS. 12 and 13. FIG. 12 is an illustration showing the configuration of MN. FIG. 13 is a format of the BU message with the ICMPPTB message transmitted from MN.

The MN 53 is a communication device that transmits and receives data in packet units to or from the CN 52 or the like and mobile unit that can move in the IP network; for example, it is a mobile computer, a mobile telephone, or the like. When the MN 53 moves during reception of data to update the path, it collects information about link MTUs of links connected to MAPs existing on the path after the update and announces a minimum of the link MTUs thus collected, as the Path MTU to the correspondent (CN 52). For implementing it, the MN 53 is provided with antenna 53*a*, transceiver 53*b*, storage 53*c*, and processor 53*d*. Particularly, the processor 53*d* is comprised of link MTU advertisement receiving function 53*e*, Path MTU setting function 53*f*, Path MTU discovery execution determining function 53*g*, and Path MTU announcing function 53*h*. Each of the functions 53*e*-53*h* in the processor 53*d* is implemented by letting a computer execute a dedicated program.

The link MTU advertisement receiving function 53*e* is a function of, when the MN 53 moves to cause a handoff of AR as a connected node and a update of the path, letting the transceiver 53*b* send the BU message through antenna 53*a* to MAPs existing in the IP network. Then the link MTU advertisement receiving function 53*e* receives an acknowledgement message to the BU message through antenna 53*a* and transceiver 53*b* from each of MAPs receiving the BU message. Furthermore, the link MTU advertisement receiving function 53*e* searches for MAPs existing on the path to the correspondent (CN 52) on the basis of the acknowledgement messages, acquires link MTUs from the acknowledgement messages from the MAPs thus found by the search, and preserves them in the storage 53*c*.

The Path MTU setting function 53*f* extracts a minimum out of the link MTUs acquired by the link MTU advertisement receiving function 53*e* and preserved in the storage 53*c* (i.e., the MTUs of links connected to the MAPs existing on the path between MN 53 and CN 52) and the link MTU of the MN 53 itself, sets the minimum as a Path MTU, and preserves it in the storage 53*c*.

The Path MTU discovery execution determining function 53*g* compares the Path MTU of the path before the handoff preserved in the storage 53*c*, with the Path MTU of the path after the handoff set by the Path MTU setting function 53*f*. When the Path MTU before the handoff is different from the Path MTU after the handoff, the Path MTU discovery execution determining function 53*g* determines that the execution of Path MTU discovery is necessary. When they are equal, it is determined that the execution of Path MTU discovery is not necessary.

When the Path MTU discovery execution determining function 53*g* determines that the execution of Path MTU discovery is necessary, the Path MTU announcing function 53*h* adds the ICMPPTB message to the BU message and lets the transceiver 53*b* send the BU message through antenna 53*a* to the CN 52. On this occasion, the Path MTU announcing function 53*h* writes the Path MTU set by the Path MTU setting function 53*f*, into the ICMPPTB message.

As shown in FIG. 13, the BU message with the ICMPPTB message is of the same format as the BU message used in Mobile IPv6, as to the data configuration from the IPv6 base header to the Home address option, and is a message obtained by adding the ICMPPTB message to the data configuration. In the ICMPPTB message, the Path MTU set by the Path MTU setting function 53*f* is written in MTU field d2. When in the BU message number 2 is set as a value in Next Header field d1 of the BU option header, it indicates that the ICMPPTB message is added.

The ICMPPTB message is an error message sent when a size of a packet is too big for a node on the path to transport the packet, but it does not have the meaning as an error message herein, because it is used for the advertisement of the Path MTU.

Figure 14:
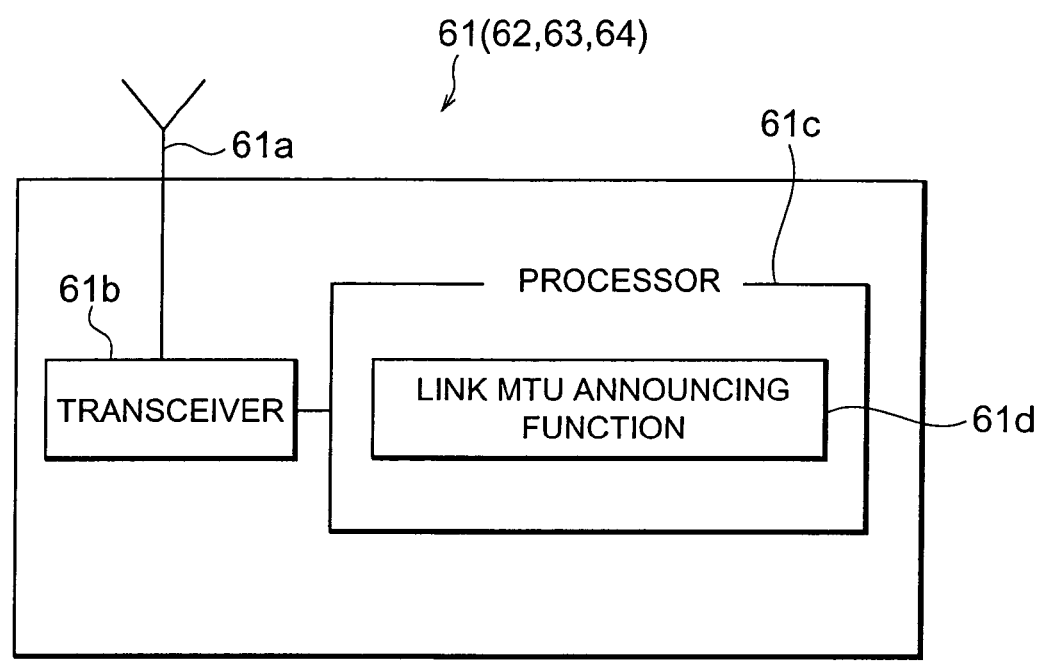
FIG. 14 is an illustration showing the configuration of the mobility anchor point of FIG. 11.
Figure 15:
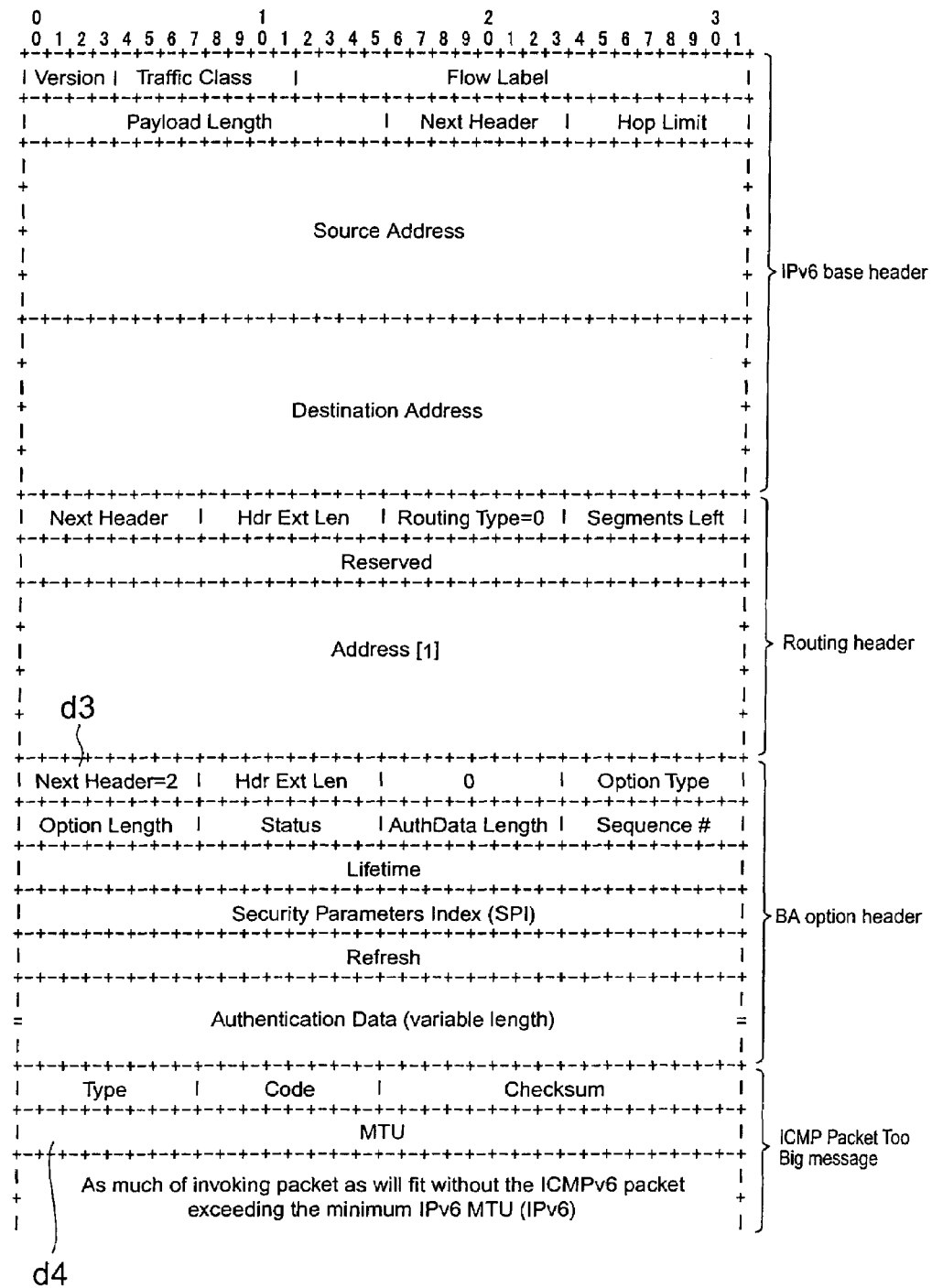
FIG. 15 shows a format of an acknowledgement message with an ICMPPTB message transmitted from the mobility anchor point of FIG. 11.

MAPs 61-64 will be described while also referring to FIGS. 14 and 15. FIG. 14 is an illustration showing the configuration of MAPs. FIG. 15 shows a format of the acknowledgement message sent with the ICMPPTB message sent from MAPs. Since the MAPs 61-64 have the same configuration, the configuration of MAP 61 will be described as a representative.

The MAP 61 is a device for relaying data flowing on the IP network and is, for example, a router. The MAP 61 manages the local location information of MN 53, and the MN 53 registers in the MAP 61 an address locally acquired in the control area where the MAP 61 is set. When the MAP 61 receives a packet addressed to MN 53, the MAP 61 forwards the packet to the address of MN 53 registered therein. On that occasion, the MAP 61 adds the IP header with the source being MAP 61 and the destination being the registered address of MN 53 to the packet having been transported thereto. When receiving the BU message from MN 53 or the like, the MAP 61 announces its link MTU by an acknowledgement message to the BU message. For implementing it, the MAP 61 is provided with antenna 61a, transceiver 61b, and processor 61c. Particularly, the processor 61c is comprised of link MTU announcing function 61d. The function 61d in the processor 61c is implemented by letting a computer execute a dedicated program.

When the link MTU announcing function 61d receives the BU message through antenna 61a and transceiver 61b, it adds the ICMPPTB message to the acknowledgement message to the BU message, and lets the transceiver 61b send the acknowledgement message through antenna 61a to the sender of the BU message (MN 53). On this occasion, the link MTU announcing function 61d writes the link MTU of the link connected to its own node, into the ICMPPTB message.

As shown in FIG. 15, the acknowledgement message with the ICMPPTB message is of the same format as the Binding ACKnowledgement message used in Mobile IPv6, as to the data configuration from the IPv6 base header to the BA option header, and is a message in which the ICMPPTB message is added to the data configuration. In the ICMPPTB message, the link MTU is written in MTU field d4. In the acknowledgement message, where number 2 is set as a value in the Next Header field d3 of the BA option header, it indicates that the ICMPPTB message is added.

Figure 16:
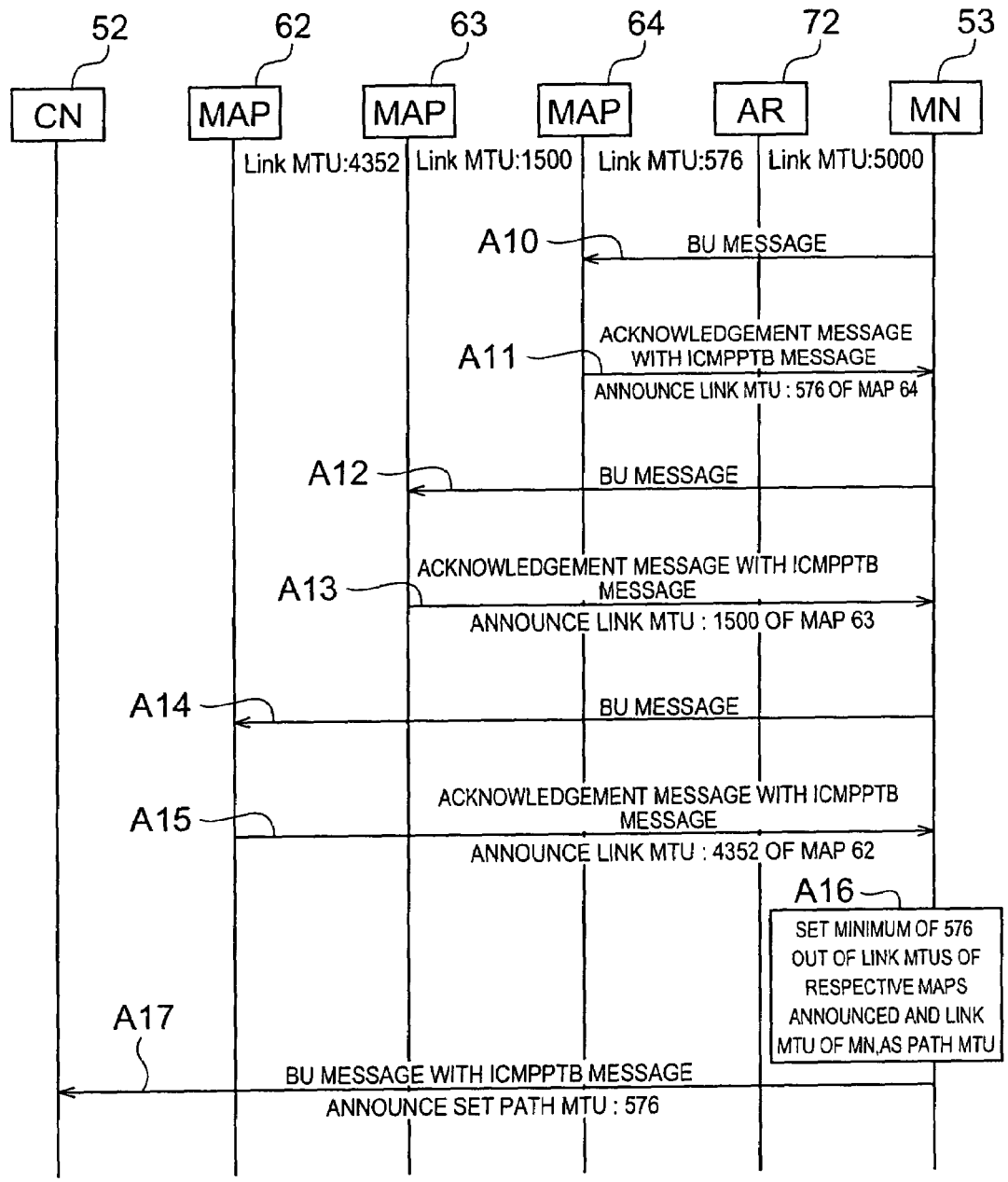
FIG. 16 is a flow showing the operations of the mobile node, mobility anchor points, and correspondent node upon a update from path A to path B in the packet communication system according to the third embodiment.
Figure 17:
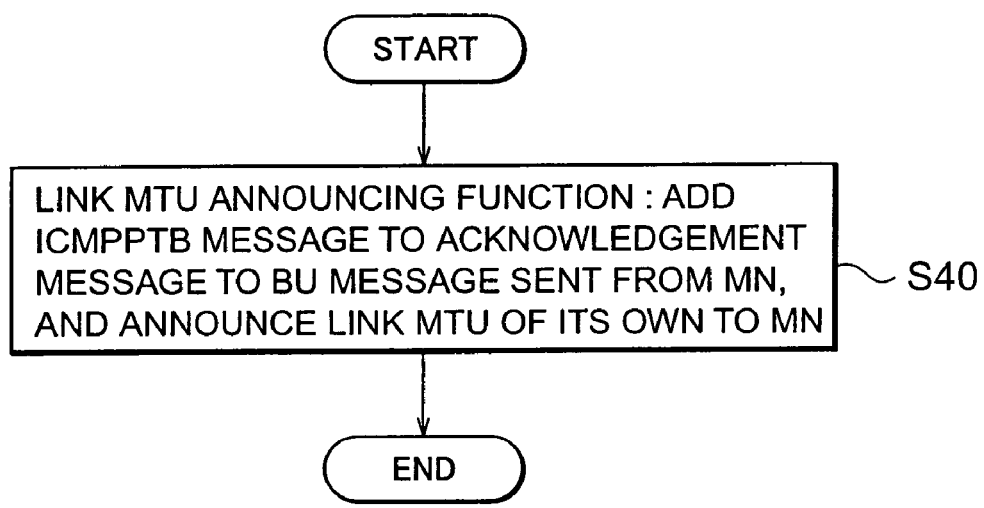
FIG. 17 is a flowchart of the Path MTU discovery method at the mobility anchor point according to the third embodiment.
Figure 18:
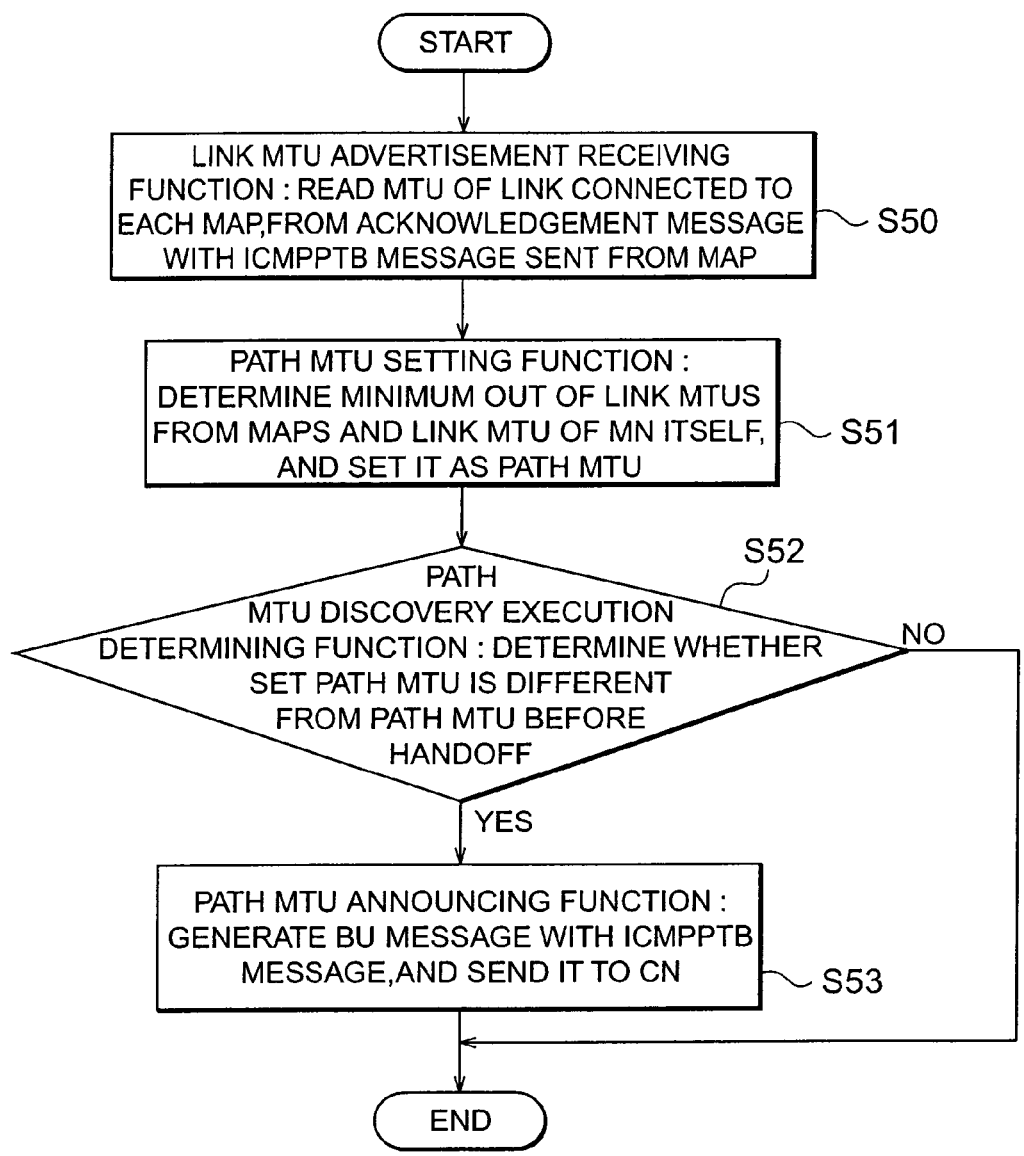
FIG. 18 is a flowchart of the Path MTU discovery method at the mobile node in the third embodiment.

Now let us explain the operation in the case where in the packet communication system 51, during transmission of data on the path A from CN 52 to MN 53, the MN 53 moves to cause a handoff from AR 71 to AR 72 as a connected node and a update of the path to the path B, along the flow of FIG. 16. In particular, the operation in MAPs 62-64 will be described along the flowchart of FIG. 17, and the operation in MN 53 along the flowchart of FIG. 18. FIG. 16 is the flow showing the operations of the MN, MAPs, and CN where the path is updated from path A to path B in the packet communication system of the third embodiment. FIG. 17 is the flowchart of the Path MTU discovery method in the MAPs according to the third embodiment. FIG. 18 is the flowchart of the Path MTU discovery method in the MN according to the third embodiment.

The description is based on the premise that CN 52 determined the Path MTU of 4353 bytes of the path A by the Path MTU discovery, preserves it in its storage (not shown), and is transmitting packets on the basis of the Path MTU.

After a handoff from AR 71 to AR 72 as a connected node, the MN 53 sends the BU message to each of MAPs existing on the IP network, in order to collect the link MTUs of MAPs 62-64 existing on the path B (A10, A12, and A14 in FIG. 16).

When receiving the BU message from MN 53, the MAP 64 writes the link MTU (576 bytes) of the link connected to the node itself, into the ICMPPTB message and adds the ICMPPTB message to the acknowledgement message to the BU message (S40 in FIG. 17). Then the MAP 64 sends the acknowledgement message to MN 53 (A11 in FIG. 16) and terminates the processing (S40 in FIG. 17).

When receiving the BU message from MN 53, the MAP 63 writes the link MTU (1500 bytes) of the link connected to the node itself, into the ICMPPTB message and adds the ICMPPTB message to the acknowledgement message to the BU message (S40 in FIG. 17). Then the MAP 63 sends the acknowledgement message to MN 53 (A13 in FIG. 16) and terminates the processing (S40 in FIG. 17).

When receiving the BU message from MN 53, the MAP 62 writes the link MTU (4352 bytes) of the link connected to the node itself, into the ICMPPTB message and adds the ICMPPTB message to the acknowledgement message to the BU message (S40 in FIG. 17). Then the MAP 62 sends the acknowledgement message to MN 53 (A15 in FIG. 16) and terminates the processing (S40 in FIG. 17).

When receiving the acknowledgement messages from the respective MAPs, the MN 53 searches for the MAPs 62-64 existing on the path B on the basis of the acknowledgement messages and reads the link MTUs of the respective links connected to the MAPs 62-64, out of the acknowledgement messages from the MAPs 62-64 obtained by the search (S50 in FIG. 18). On this occasion, the MN 53 reads 4352 bytes as the link MTU of MAP 62, 1500 bytes as the link MTU of MAP 63, and 576 bytes as the link MTU of MAP 64.

Then the MN 53 obtains a minimum out of the link MTUs of MAPs 62-64 and the link MTU (5000 bytes) of the link connected to the node MN itself, sets the minimum as a Path MTU, and preserves it in the storage 53c (A16 in FIG. 16) (S51 in FIG. 18). On this occasion, the MN 53 determines 576 bytes as a minimum out of 4352 bytes, 1500 bytes, and 576 bytes of the respective link MTUs of MAPs 62-64 and 5000 bytes of the link MTU of MN 53, and sets 576 bytes as a Path MTU.

Subsequently, the MN 53 determines whether the set Path MTU is different from the Path MTU of the path A before the handoff from AR 71 to AR 72 as a connected node. When they are different, the MN 53 then determines that the execution of Path MTU discovery is necessary, and transfers to the process of step S53; when they are equal, the MN 53 determines that the execution of Path MTU discovery is not necessary, and terminates the processing (S52 in FIG. 18). On this occasion, since the set Path MTU of 576 bytes is different from the Path MTU of 4352 bytes before the handoff, the MN 53 determines that the execution of Path MTU discovery is necessary.

Finally, when it is determined that the execution of Path MTU discovery is necessary, the MN 53 generates the BU message with the ICMPPTB message indicating the set Path MTU and sends the BU message to CN 52 (A17 in FIG. 16); and then it terminates the processing (S53 in FIG. 18). On this occasion, the Path MTU of 576 bytes is indicated as the ICMPPTB message in MN 53.

When receiving the BU message with the ICMPPTB message from MN 53, the CN 52 updates the preserved Path MTU to the Path MTU indicated in the ICMPPTB message, and then preserves the updated Path MTU in the storage (not shown). Then the CN 52 changes the transmitted packet size on the basis of the updated Path MTU and sends packets to MN 53. On this occasion, the CN 52 resets the Path MTU to the Path MTU of 576 bytes announced by the MN 53, and sends packets in units of 576 bytes. In passing, even in the case where packets are transported to MAPs 63, 64, because the CN 52 is transmitting packets in the updated packet size of 576 bytes, the MAPs 63, 64 can transport the packets and thus issue no ICMPPTB message to the CN 52. Accordingly, the CN 52 does not have to perform any rediscovery of Path MTU.

If the MN 53 fails to collect the link MTUs from the nodes (routers) other than the MAPs existing on the path and sets the Path MTU on the basis of link MTUs from certain MAPs on the path, there can occur cases where the MAPs other than the certain MAPs on the path could fail to transport a packet and issue an ICMPPTB message to the CN 52. In such cases, the CN 52 needs to perform the rediscovery of Path MTU only when it receives the ICMPPTB message from the MAPs other than the certain MAPs on the path, and the number of rediscoveries of Path MTU can be reduced even in the cases.

In the packet communication system 51 according to the third embodiment, the MN 53 collects the information about the link MTUs of MAPs existing on the path from the correspondent node (CN 52), sets the Path MTU on the basis of the information within the collected scope, and notifies the CN 52 of the Path MTU; therefore, even in the case where there exist a plurality of links with different MTUs on the path, the number of Path MTU discoveries can be reduced by the number of MAPs collected by MN 53 (link MTUs) and MN 53, in the CN 52. Particularly, even in the case where the number of MAPs existing on the path increases because of the movement of MN 53 to cause a update of the path, the CN 52 does not have to perform the Path MTU discoveries corresponding to the increased number of MAPs, and it can quickly update the Path MTU on the basis of the Path MTU announced by MN 53. Furthermore, since the CN 52 can quickly update the Path MTU, it can send data in the optimal packet size and the transmission efficiency is also increased on the network.

In the packet communication system 51 according to the third embodiment, the MN 53 can collect the information about the link MTUs of links connected to MAPs, on the basis of the ICMPPTB messages added to the acknowledgement messages to the BU messages from the MAPs, so that the MN 53 can quickly and securely collect the information about the link MTUs of the links on the path.

Figure 19:
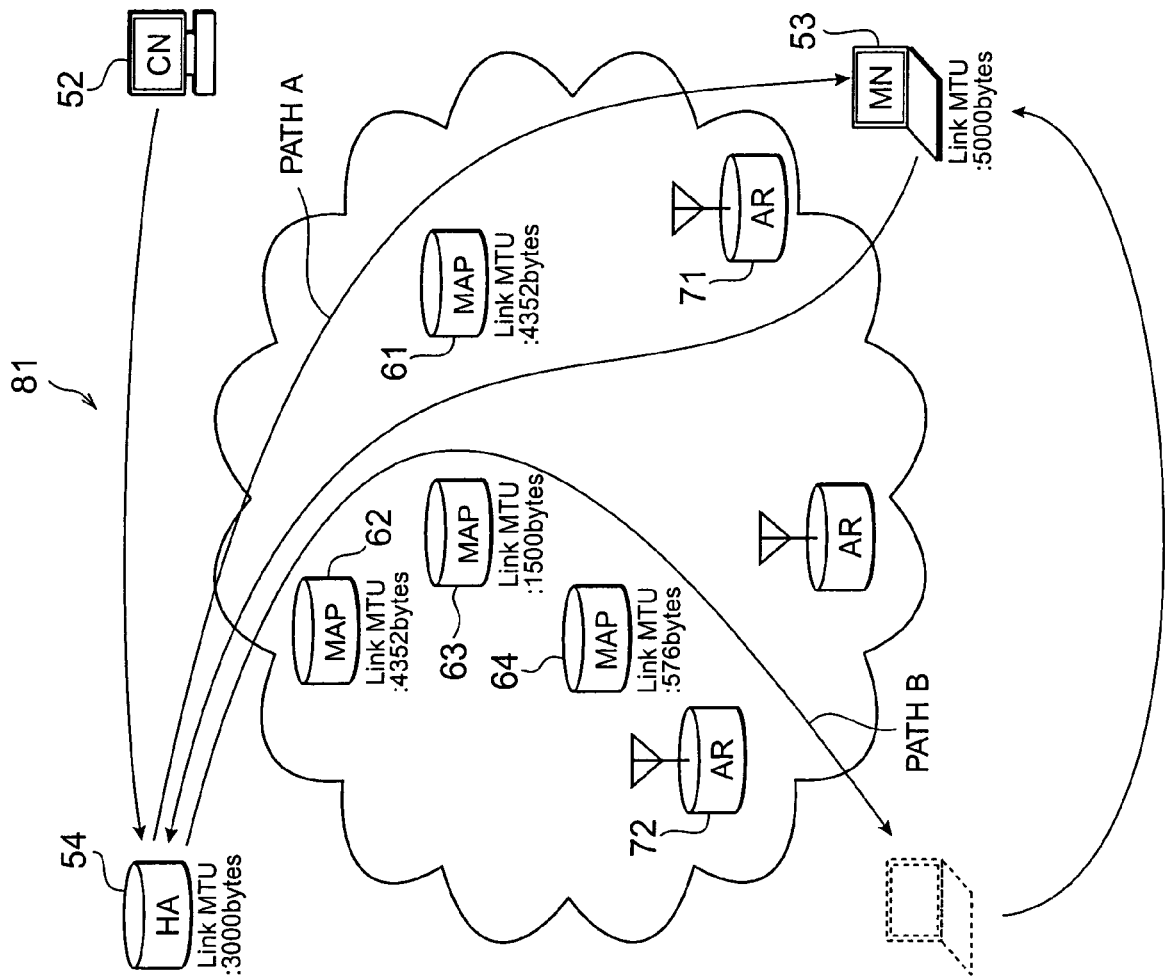
FIG. 19 is an illustration showing the whole configuration of the packet communication system according to the fourth embodiment.

The fourth embodiment will be described next. The whole configuration of packet communication system 81 according to the fourth embodiment will be described with reference to FIG. 19. FIG. 19 is an illustration showing the whole configuration of the packet communication system in the fourth embodiment. In the fourth embodiment, components similar to those in the packet communication system 51 of the third embodiment will be denoted by the same reference symbols, without redundant description thereof.

The packet communication system 81 is configured on the IP network consisting of a great number of nodes and links, as the packet communication system 51 in the third embodiment was. It is assumed that in the packet communication system 81, during transmission of data on path B from CN 52 to MN 53, the MN 53 moved to cause a handoff from AR 72 to AR 71 as a connected node and a update of the path to path A. On this occasion, there existed three MAPs 62-64 and the HA 54 on the path B from CN 52 to MN 53 and the Path MTU of path B was the link MTU of 576 bytes of the link connected to MAP 64 out of them. Therefore, the CN 52 preserves 576 bytes as a Path MTU and transmitted packets in units of 576 bytes to MN 53. On the other hand, there exist one MAP 61 and the HA 54 on the path A from CN 52 to MN 53, the link MTU of MAP 61 is 4352 bytes, the link MTU of HA 54 3000 bytes, and the link MTU of MN 53 5000 bytes.

The CN 52 has the configuration and operation similar to those in the third embodiment, but it also performs the following operation in particular in the fourth embodiment. When the CN 52 receives the ICMPPTB message from HA 54 after transmission of a packet addressed to MN 53, it performs the operation similar to that upon receipt of the BU message with the ICMPPTB message from MN 53 in the third embodiment.

The MN 53 has the configuration and operation similar to those in the third embodiment, but it also performs the following operation in particular in the fourth embodiment. In the case where HA 54 also exists on the path, the Path MTU announcing function 53h (cf. FIG. 12) of MN 53 sends the BU message with the ICMPPTB message to HA 54.

Figure 20:
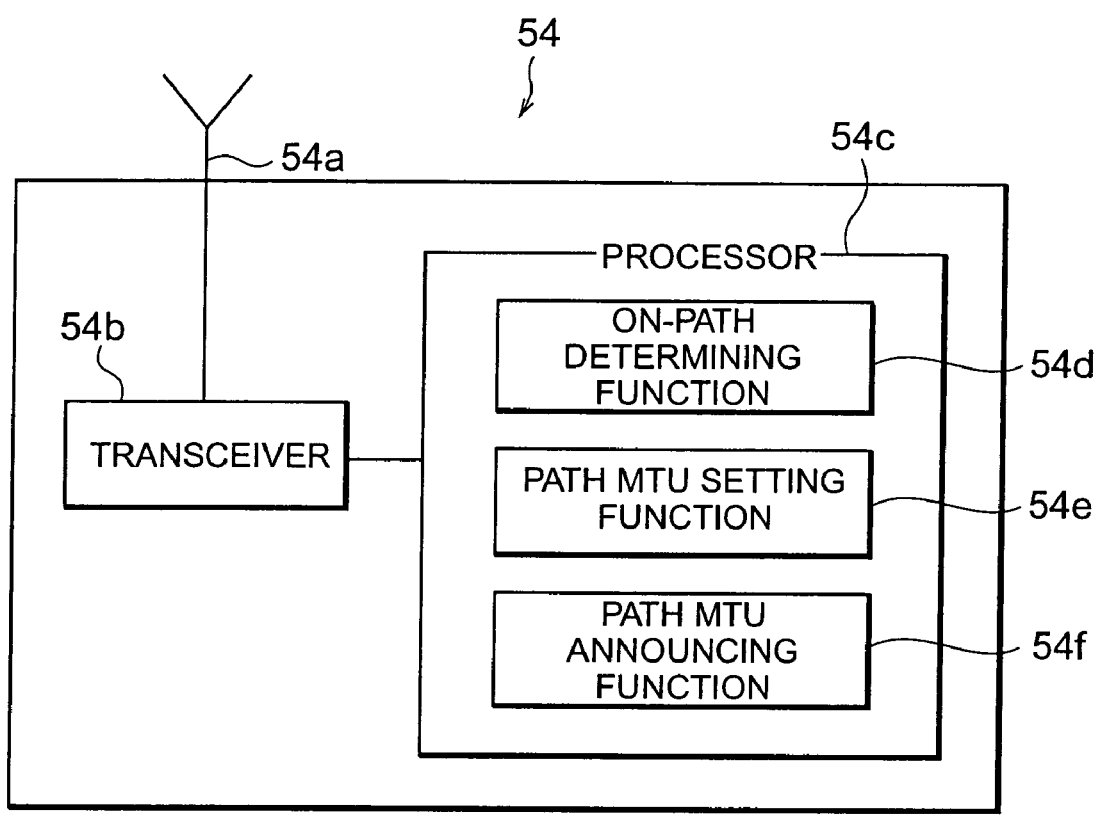
FIG. 20 is an illustration showing the configuration of the home agent in FIG. 19.

The HA 54 will be described while also referring to FIG. 20. FIG. 20 is an illustration showing the configuration of HA.

The HA 54 is a device that manages the global location information of MN 53 and is, for example, a router. When the HA 54 receives a packet addressed to MN 53 during a period in which the MN 53 stays away from the network under control of HA 54 and is connected to another network, it forwards the packet to an address registered in the HA 54 and presently temporarily acquired by the MN 53. On that occasion, the HA 54 adds the IP header with the source being HA 54 and the destination being the address presently temporarily acquired by the MN 53, to the packet having been transported thereto. When receiving the BU message with the ICMPPTB message from MN 53, the HA 54 determines that it exists on the path between CN 52 and MN 53, sets a new Path MTU, and announces the new Path MTU to the CN 52. For implementing it, the HA 54 is provided with antenna 54a, transceiver 54b, and processor 54c. Particularly, the processor 54c is comprised of on-path determining function 54d, Path MTU setting function 54e, and Path MTU announcing function 54f. Each of the functions 54d-54f in the processor 54c is implemented by letting a computer execute a dedicated program.

The on-path determining function 54d receives the BU message through antenna 54a and transceiver 54b from MN 53. Then the on-path determining function 54d determines that its own node (HA 54) exists on the path between CN 52 and MN 53, when the BU message contains the ICMPPTB message. The Path MTU set at MN 53 is indicated in the ICMPPTB message.

When the on-path determining function 54d determines that its own node exists on the path between CN 52 and MN 53, the Path MTU setting function 54e compares the Path MTU indicated in the ICMPPTB message, with the link MTU of the link connected to its own node. Then the Path MTU setting function 54e sets the smaller as a new Path MTU and preserves it in the storage (not shown).

When receiving a packet addressed to MN 53 under a situation in which the Path MTU setting function 54e has set the Path MTU, the Path MTU announcing function 54f discards the packet and lets the transceiver 54b send the ICMPPTB message through antenna 54a to CN 52. On this occasion, the Path MTU announcing function 54f writes the Path MTU set by the Path MTU setting function 54e, into the ICMPPTB message. In this ICMPPTB message, the Path MTU is written in the data configuration similar to that of the ICMPPTB message shown in FIG. 13.

Figure 21:
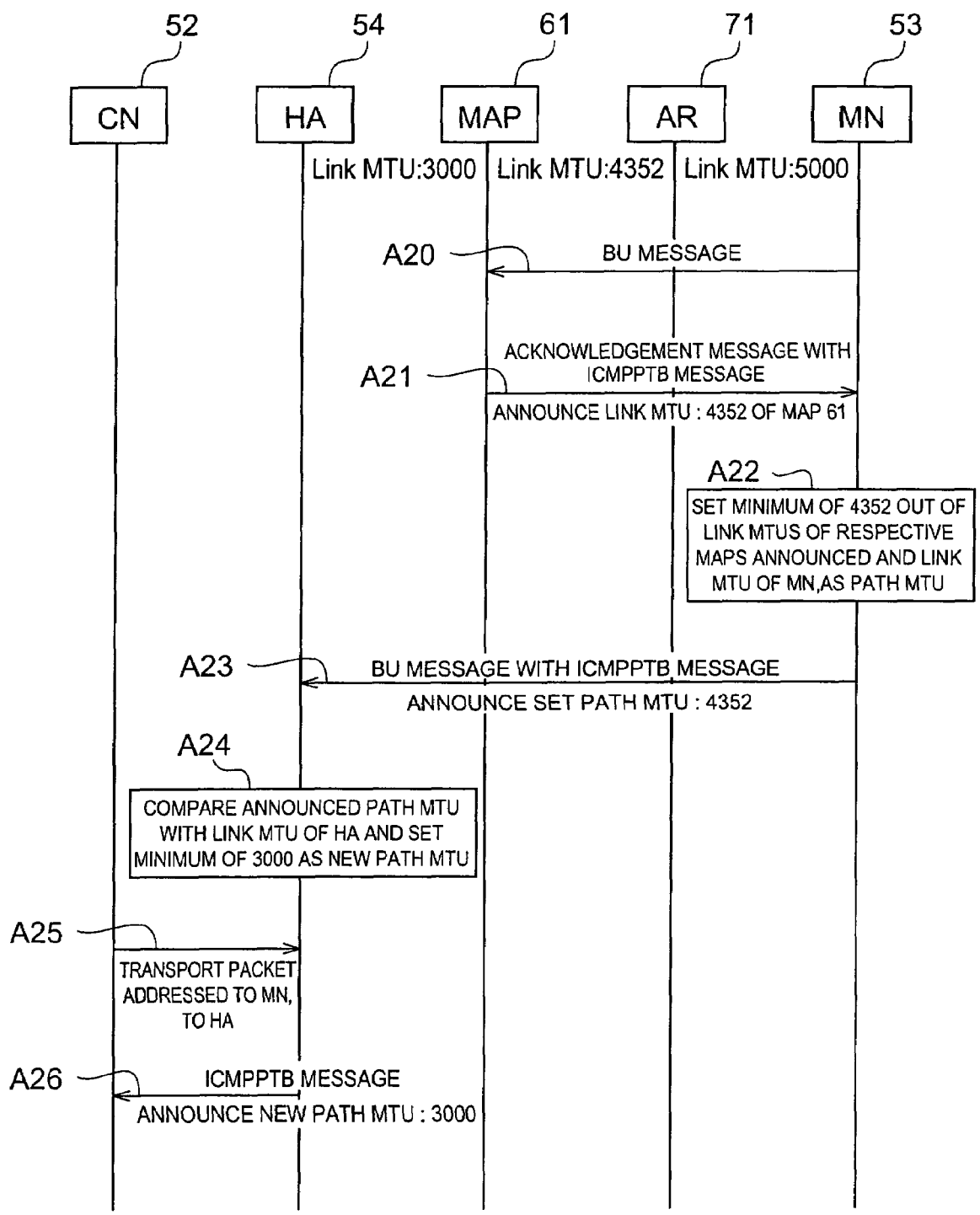
FIG. 21 is a flow showing the operations of the mobile node, mobility anchor point, home agent, and correspondent node upon a update from path B to path A in the packet communication system according to the fourth embodiment.
Figure 22:
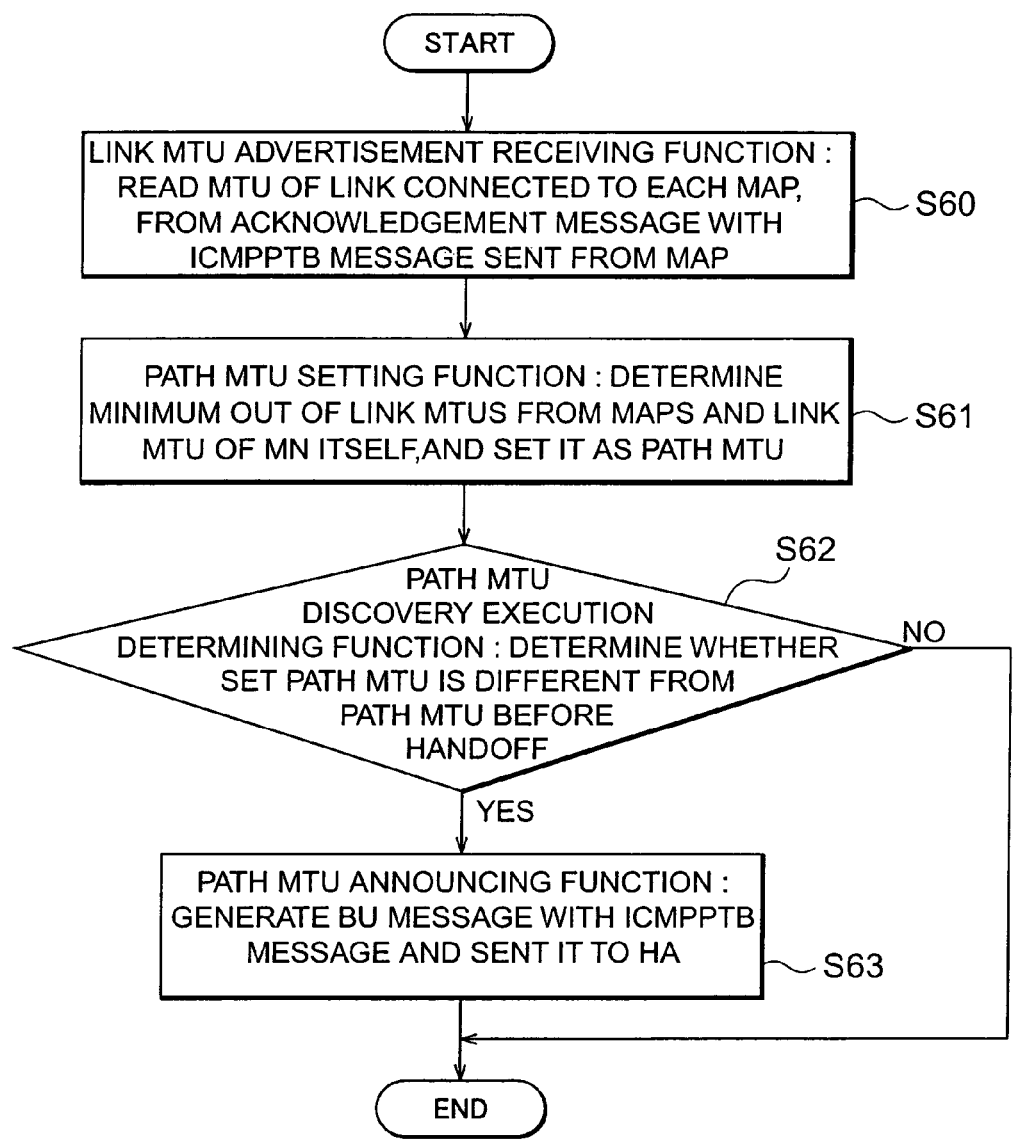
FIG. 22 is a flowchart of the Path MTU discovery method at the mobile node in the fourth embodiment.
Figure 23:
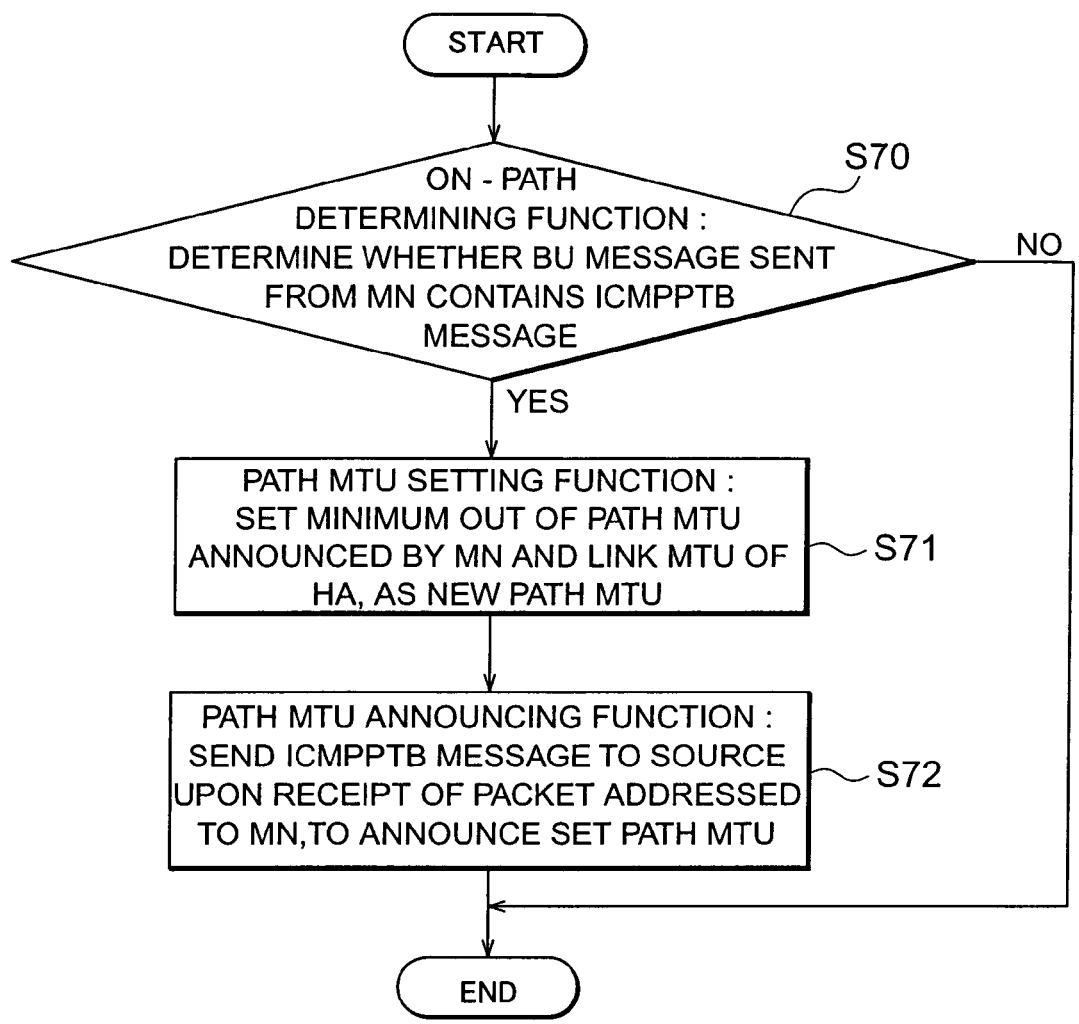
FIG. 23 is a flowchart of the Path MTU discovery method at the home agent in the fourth embodiment.
Figure 24:
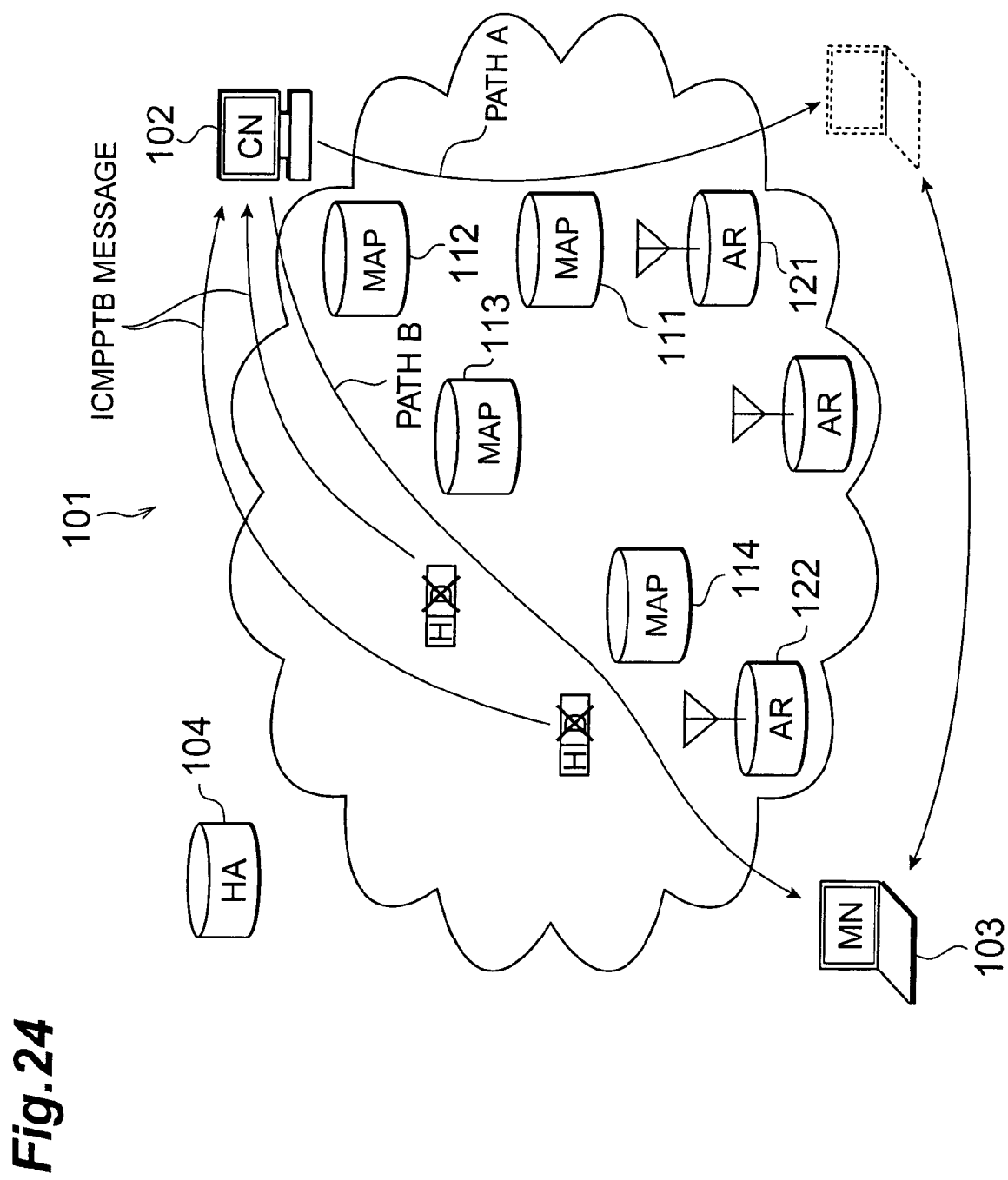
FIG. 24 is a whole configuration diagram showing an example of the conventional packet communication system.
Figure 25:
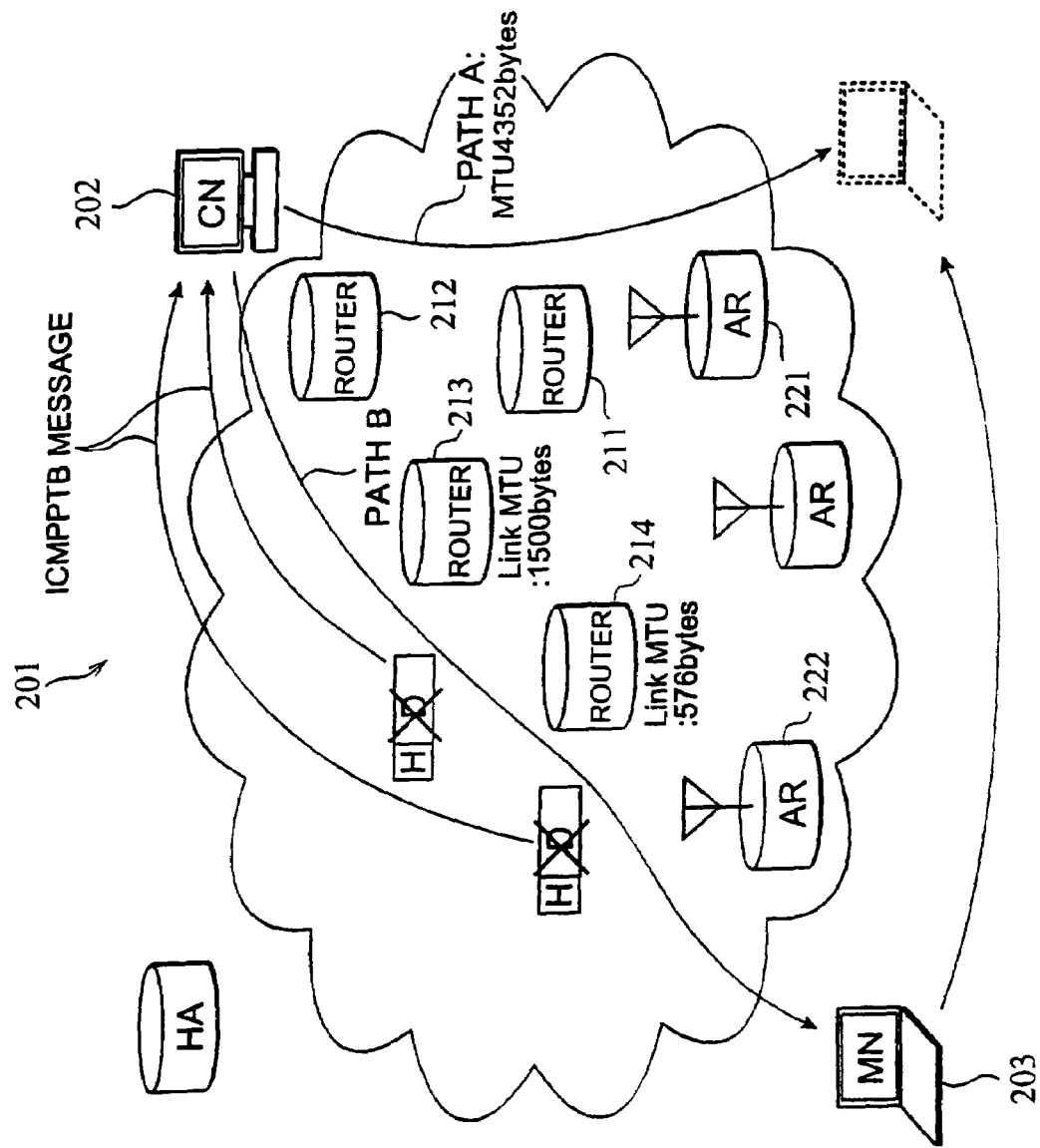
FIG. 25 is a whole configuration diagram showing another example of the conventional packet communication system.

Now let us explain the operation in the case where in the packet communication system 81, during transmission of data on the path B from CN 52 to MN 53, the MN 53 moved to cause a handoff from AR 72 to AR 71 as a connected node and a update of the path to the path A, along the flow of FIG. 21. Particularly, the operation in MN 53 will be described along the flowchart of FIG. 22, and the operation in HA 54 along the flowchart of FIG. 23. FIG. 21 is the flow showing the operations of the MN, MAP, HA, and CN upon the update of the path from path B to path A in the packet communication system of the fourth embodiment. FIG. 22 is the flowchart of the Path MTU discovery method in the MN according to the fourth embodiment. FIG. 23 is the flowchart of the Path MTU discovery method in the HA according to the fourth embodiment.

The description is based on the premise that the CN 52 determined the Path MTU of 576 bytes as that of the path B by Path MTU discovery, preserves it in the storage (not shown), and is transmitting packets on the basis of the Path MTU.

After a handoff from AR 72 to AR 71 as a connected node, the MN 53 sends the BU message to each of MAPs existing on the IP network, in order to collect the link MTU from MAP 61 existing on the path A (A20 in FIG. 21).

Receiving the BU message from MN 53, the MAP 61 writes the link MTU (4352 bytes) of the link connected to the node itself, into the ICMPPTB message and adds the ICMPPTB message to the acknowledgement message to the BU message. Then the MAP 61 sends the acknowledgement message to MN 53 (A21 in FIG. 21).

When receiving the acknowledgement messages from MAPs, the MN 53 searches for MAP 61 existing on the path A on the basis of the acknowledgement messages, and reads the link MTU of the link connected to MAP 61, out of the acknowledgement message from MAP 61 obtained by the search (S60 in FIG. 22). On this occasion, the MN 53 reads 4352 bytes as the link MTU of MAP 61.

Then the MN 53 obtains a minimum out of the link MTU of MAP 61 and the link MTU (5000 bytes) of the link connected to the node itself, sets the minimum as a Path MTU, and preserves it in the storage 53c (A22 in FIG. 21) (S61 in FIG. 22). On this occasion, the MN 53 obtains 4352 bytes as the minimum out of the link MTU of 4352 bytes of MAP 61 and the link MTU of 5000 bytes of MN 53, and sets 4352 bytes as a Path MTU.

Subsequently, the MN 53 determines whether the set Path MTU is different from the Path MTU of the path B before the handoff from AR 72 to AR 71 as a connected node. When they are different, the MN 53 determines that the execution of Path MTU discovery is necessary, and transfers to the process of step S63; when they are equal, the MN 53 determines that the execution of Path MTU discovery is not necessary, and terminates the processing (S62 in FIG. 22). On this occasion, the MN 53 determines that the execution of Path MTU discovery is necessary, because the Path MTU of 576 bytes before the handoff is different from the set Path MTU of 4352 bytes.

Finally, when determining that the execution of Path MTU discovery is necessary, the MN 53 generates the BU message with the ICMPPTB message indicating the set Path MTU, and sends the BU message to HA 54 (A23 in FIG. 21); and the MN 53 terminates the processing (S63 in FIG. 22). On this occasion, in MN 53, the Path MTU of 4352 bytes is indicated as the ICMPPTB message.

When receiving the BU message from MN 53, the HA 54 determines whether the BU message contains the ICMPPTB message (S70 in FIG. 23). When the BU message contains the ICMPPTB message, the HA 54 then proceeds to the process of step S71 to set a new Path MTU; when the BU message contains no ICMPPTB message, the HA 54 terminates the processing (S70 in FIG. 23).

When the BU message contains the ICMPPTB message, the HA 54 sets the new Path MTU to a minimum out of the Path MTU indicated in the ICMPPTB message and the link MTU of the link connected to the node itself (A24 in FIG. 21) (S71 in FIG. 23). On this occasion, the HA 54 determines 3000 bytes as a minimum out of the announced Path MTU of 4352 bytes and the link MTU of 3000 bytes of HA 54, and sets 3000 bytes as a new Path MTU.

Finally, when receiving a packet addressed to MN 53 from CN 52 (A25 in FIG. 21), the HA 54 generates the ICMPPTB message indicating the new Path MTU, and sends the generated ICMPPTB message to CN 52 (A26 in FIG. 21); and it terminates the processing (S72 in FIG. 23). On this occasion, in HA 54, the Path MTU of 3000 bytes is indicated as the ICMPPTB message.

When the CN 52 receives the ICMPPTB message from HA 54 after transmission of a packet destined for MN 53, it updates the preserved Path MTU to the Path MTU indicated in the ICMPPTB message, and preserves the updated Path MTU in the storage (not shown). Then the CN 52 changes the transmitted packet size on the basis of the updated Path MTU and sends packets in the changed size to MN 53. On this occasion, the CN 52 resets the Path MTU to the Path MTU of 3000 bytes announced by the HA 54, and sends packets in units of 3000 bytes. In passing, even in the case where the Path MTU increased from 576 bytes to 3000 bytes because of the update of the path from path B to path A, the CN 52 does not have to perform the rediscovery of Path MTU, because the Path MTU is updated by the ICMPPTB message from HA 54. Accordingly, without need for waiting for ten minutes before execution of the rediscovery of Path MTU, packets are transmitted in the packet size according to the increased Path MTU, and thus good transmission efficiency is achieved on the network.

In addition to the effects in the third embodiment, the packet communication system 81 in the fourth embodiment presents the following effect: even in the case where HA 54 exists on the path between CN 52 and MN 53, HA 54 sets the new Path MTU in consideration of the information about the link MTU of the node itself as well, and thus the CN 52 does not have to perform the Path MTU discovery in consideration of the link MTU of HA 54. Particularly, even in the case where the Path MTU increased because of the movement of MN 53 to cause a update of the path, the CN 52 can quickly update the Path MTU on the basis of the announced Path MTU.

The embodiments according to the present invention were described above, but it is noted that the present invention can be carried out in a variety of modes, without being limited to the above embodiments.

For example, the embodiments were the examples of a single update of the path between path A and path B, but the invention is also applicable to cases where MN moves to cause successive handoffs among ARs of the connected node and successive updates of the path; in such cases, the CN is notified of the Path MTU every handoff.

The embodiments were the examples where the information about all the MAPs on the path was successfully collected through the AR, but the present invention is also applicable to cases where only information about certain MAPs on the path can be collected; where the CN receives the ICMPPTB messages from the certain MAPs, the CN can perform the Path MTU discovery on the basis of the Path MTUs announced by the MN and the link MTUs of the rest MAPs on the path for that the MN failed to collect information.

In the embodiments the HA announced the Path MTU through the ICMPPTB message, but the Path MTU may also be announced through the BU message with the ICMPPTB message.

According to the present invention, the destination node collects the information on the path, preliminarily determines the Path MTU on the basis of the collected information, and announces the Path MTU to the correspondent node or the like; therefore, the correspondent node can decrease the number of Path MTU discoveries by the announced Path MTU and can quickly update the Path MTU even with increase or decrease of the Path MTU upon movement of the destination node to cause a update of the path. Accordingly, the present invention permits the Path MTU discovery to be carried out very efficiently and quickly in response to the change of the Path MTU, as compared with the prior art.

According to the present invention, the destination node collects the information about every entry point of multiple tunnels existing on the path, preliminarily estimates the Path MTU on the basis of the collected information, and announces the Path MTU to the correspondent node; therefore, even in the case where there exist a plurality of entry points of multiple tunnels on the path, the correspondent node can reduce the number of Path MTU discoveries by the announced Path MTU. Particularly, in the case of a movement of the destination node to update the path, even if the number of entry points of multiple tunnels on the path increases, the number of Path MTU discoveries will not increase corresponding to the increase in the number of entry points; furthermore, the Path MTU can be quickly updated even with increase in the Path MTU because of a decrease in the number of entry points of multiple tunnels.

According to the present invention, each mobility anchor point announces the information of its own sequentially to a lower-layer mobility anchor point while accumulating information about every upper-layer mobility anchor point on the path; therefore, finally, the mobile node can be notified of the information about the mobility anchor points in all the layers existing on the path. For this reason, the mobile node can readily select a mobility anchor point or mobility anchor points existing on the path from the correspondent node to the mobile node, based on the information about the mobility anchor points thus notified of.

According to the present invention, the home agent preliminarily estimate the Path MTU allowing for the encapsulation at the home agent and announces the Path MTU to the correspondent node; therefore, even in the case where the home agent exists on the path, the correspondent node does not have to perform the Path MTU discovery corresponding to the encapsulation at the home agent.

According to the present invention, the destination node sets the Path MTU on the basis of the information about the link MTUs collected from the nodes on the path and announces the Path MTU to the correspondent node; therefore, even in the case where there exist a plurality of links with different MTUs on the path, the correspondent node can decrease the number of Path MTU discoveries before the final discovery of the Path MTU by the announced Path MTU. Particularly, in the case of a movement of the destination node to cause a update of the path, even if the number of nodes on the path increases, the number of Path MTU discoveries will not increase corresponding to the increase; furthermore, the Path MTU can be quickly updated even with increase or decrease of the Path MTU. Therefore, the present invention permits the Path MTU discovery to be carried out very efficiently and quickly in response to the change of the Path MTU.

According to the present invention, each mobility anchor point announces the information of its link MTU by the acknowledgement message to the binding update message, so that the destination node can quickly and securely collect the information of the link MTU.

According to the present invention, the home agent sets the new Path MTU in consideration of the link MTU of the node itself and announces the Path MTU to the correspondent node; therefore, even in the case where the home agent exists on the path, the correspondent node does not have to perform the rediscovery of Path MTU taking the link MTU of the home agent into consideration.

What is claimed is:

1. A node in a packet communication system comprised of nodes and links, said node being a destination node as a destination of a packet transmitted from a correspondent node, said node comprising:

an advertisement receiver configured to receive an advertisement of path information, when a path from the correspondent node to the destination node has been updated, about a path from the correspondent node to the destination node after the path has been updated;

a Path MTU discovery execution determining unit configured to compare path information of the path before the path has been updated and path information of the path after the path has been updated and determine whether a discovery of a Path MTU of the path from the correspondent node to the destination node should be executed;

a Path MTU setting unit configured to set a Path MTU of the path after the path has been updated on the basis of the path information of the path after the path has been updated which was received by the advertisement receiver, when the Path MTU discovery execution determining unit determines that the discovery of the Path MTU should be executed; and a Path MTU announcer configured to announce to the correspondent node the Path MTU of the path after the path has been updated which was set by the Path MTU setting unit when the Path MTU discovery execution determining unit determines that the discovery of the Path MTU should be executed.

2. A node in a packet communication system comprised of nodes and links, said node being a destination node as a destination of a packet transmitted from a correspondent node, said node comprising:

a multiple tunnel entry-point advertisement receiver configured to receive an advertisement of information, when a path from the correspondent node to the destination node has been updated, about an entry point of multiple tunnels on a path from the correspondent node to the destination node after the path has been updated;

a Path MTU discovery execution determining unit configured to compare the number of entry points of multiple tunnels on the path before the path has been updated and the number of entry points of multiple tunnels on the path after the path has been updated and determine whether a discovery of a Path MTU of the path from the correspondent node to the destination node should be executed;

a Path MTU calculator configured to calculate the Path MTU of the path after the path has been updated on the basis of the number of entry points of multiple tunnels on the path after the path has been updated when the Path MTU discovery execution determining unit determines that the discovery of the Path MTU should be executed; and a Path MTU announcer configured to announce to the correspondent node the Path MTU of the path after the path has been updated which was calculated by the Path MTU calculator when the Path MTU discovery execution determining unit determines that the discovery of the Path MTU should be executed.

3. A node in a packet communication system comprised of nodes and links, said node being a destination node as a destination of a packet transmitted from a correspondent node, said node comprising:
- a link MTU advertisement receiver configured to receive an advertisement of a link MTU, when a path from the correspondent node to the destination node has been updated, of a link connected to each node on a path from the correspondent node to the destination node after the path has been updated;
- a Path MTU setting unit configured to set a Path MTU of the path from the correspondent node to the destination node after the path has been updated, out of link MTUs received by the link MTU advertisement receiver;
- a Path MTU discovery execution determining unit configured to compare Path MTU of the path before the path has been updated and Path MTU of the path after the path has been updated which was set by the Path MTU setting unit and determine whether a discovery of a Path MTU should be executed; and
- a Path MTU announcer configured to announce to the correspondent node the Path MTU of the path after the path has been updated which was set by the Path MTU setting unit when the Path MTU discovery execution determining unit determines that the discovery of the Path MTU should be executed.

4. The node in the packet communication system according to claim 2, wherein said destination node is a mobile node that can move in the packet communication system, and
wherein the multiple tunnel entry-point advertisement receiver determines that a mobility anchor point existing on the path from the correspondent node to the mobile node and managing local movement of the mobile node is an entry point of multiple tunnels.

5. The node in the packet communication system according to claim 4, wherein the Path MTU discovery execution determining unit is configured to determine whether the discovery of the Path MTU should be executed, based on the number of mobility anchor points existing on the path from the correspondent node to the mobile node.

6. The node in the packet communication system according to claim 5, wherein the multiple tunnel entry-point advertisement receiver determines that each mobility anchor point selected upon a movement of the mobile node to update the path is the entry point of multiple tunnels,
wherein the Path MTU discovery execution determining unit is configured to compare the number of mobility anchor points existing on the path from the correspondent node to the mobile node before the movement of the mobile node with that after the movement of the mobile node and determines that the discovery of the Path MTU should be executed, when the number of mobility anchor points before the movement is different from that after the movement,
wherein the Path MTU calculator is configured to calculate the Path MTU according to (the Path MTU before the movement−a header length added at a mobility anchor point×(the number of mobility anchor points after the movement−the number of mobility anchor points before the movement)), and
wherein the Path MTU announcer is configured to announce the Path MTU calculated by the Path MTU calculator, by a binding update message.

7. The node in the packet communication system according to claim 4, wherein a mobility anchor point in an arbitrary layer existing on the path from the correspondent node to the mobile node sequentially announces information about a mobility anchor point in each layer announced by a mobility anchor point in a higher layer than the arbitrary layer and information of its own including a selection priority and layer information, to a mobility anchor point in a lower layer than the arbitrary layer, and
wherein the multiple tunnel entry-point advertisement receiver is configured to receive information about a mobility anchor point in each layer announced by a mobility anchor point in a lowest layer existing on the path from the correspondent node to the mobile node, from a connected node and selects a mobility anchor point in each layer on the basis of selection priorities in the information about mobility anchor points.

8. The node in the packet communication system according to claim 3, wherein the destination node is a mobile node that can move in the packet communication system, and
wherein the link MTU advertisement receiver is configured to retrieve a link MTU of each mobility anchor point existing on the path from the correspondent node to the mobile node and managing local movement of the mobile node.

9. The node in the packet communication system according to claim 8, wherein the link MTU advertisement receiver is configured to receive a link MTU of each mobility anchor point existing on said path, from an advertisement of the link MTU from the mobility anchor point,
wherein the Path MTU setting unit is configured to set a minimum link MTU among link MTUs of mobility anchor points retrieved by the link MTU advertisement receiver, as a Path MTU,
wherein the Path MTU discovery execution determining unit is configured to compare the Path MTU before the movement of the mobile node with that after the movement and determines that the discovery of the Path MTU should be executed, when the Path MTU before the movement is different from that after the movement, and
wherein the Path MTU announcer is configured to announce the Path MTU set by the Path MTU setting unit, by a binding update message.

10. A correspondent node in a packet communication system comprised of nodes and links, said correspondent node transmitting a packet to the node as set forth in claim 1,
said correspondent node configured to update a Path MTU preserved in itself, based on the Path MTU announced by said Path MTU announcer.

11. The correspondent node in the packet communication system according to claim 10, wherein the destination node is a mobile node that can move in the packet communication system, and
wherein upon a movement of the mobile node to update a connected node, the Path MTU preserved in the correspondent node is updated on the basis of the Path MTU announced by the Path MTU announcer, a packet size is changed based on the Path MTU thus updated, and a packet of the packet size thus changed is transmitted to the mobile node.

12. A mobility anchor point in a packet communication system comprised of nodes and links, said mobility anchor point being a mobility anchor point managing local movement of the mobile node as set forth in claim 4,
said mobility anchor point configured to announce to a mobility anchor point in a lower layer existing on the path from the correspondent node to the mobile node, information about a mobility anchor point in each layer announced by a mobility anchor point in a higher layer existing on the path, and information of its own including a selection priority and layer information.

13. A mobility anchor point in a packet communication system comprised of nodes and links, said mobility anchor point being a mobility anchor point managing local movement of the mobile node as set forth in claim 8, said mobility anchor point comprising:
a link MTU announcer configured to announce a link MTU of a link connected to said mobility anchor point, to the mobile node.

14. The mobility anchor point in the packet communication system according to claim 13, wherein the link MTU announcer is configured to announce the link MTU by adding the link MTU to an acknowledgement message to a binding update message transmitted from the mobile node.

15. A home agent in a packet communication system comprised of nodes and links, said home agent being a home agent managing global movement of the mobile node as set forth in claim 4, said home agent comprising:
a multiple tunnel entry-point determining unit configured to determine whether said home agent is an entry point of multiple tunnels on the path from the correspondent node to the mobile node;
a Path MTU calculator configured to calculate a Path MTU of the path from the correspondent node to the mobile node, based on the number of entry points of multiple tunnels at the home agent; and
a Path MTU announcer configured to announce the Path MTU calculated by the Path MTU calculator, to the correspondent node.

16. The home agent in the packet communication system according to claim 15, wherein the Path MTU calculator is configured to recalculate the Path MTU, based on the Path MTU announced by the mobile node, and
wherein the Path MTU announcer is configured to announce the Path MTU calculated by the Path MTU calculator, by an ICMP Packet Too Big message.

17. A home agent in a packet communication system comprised of nodes and links, said home agent being a home agent managing global movement of the mobile node as set forth in claim 8, said home agent comprising:
an on-path determining unit configured to determine whether said home agent exists on the path from the correspondent node to the mobile node;
a Path MTU setting unit configured to set a Path MTU of the path from the correspondent node to the mobile node, based on a link MTU of a link connected to the home agent; and
a Path MTU announcer configured to announce the Path MTU set by the Path MTU setting unit, to the correspondent node.

18. The home agent in the packet communication system according to claim 17, wherein the Path MTU setting unit is configured to set a new Path MTU, based on the Path MTU announced by the mobile node, and
wherein the Path MTU announcer is configured to announce an ICMP Packet Too Big message containing the Path MTU set by the Path MTU setting unit, to the correspondent node.

19. A packet communication system comprised of nodes and links, wherein a destination node as a destination of a packet transmitted from a correspondent node, comprises:
advertisement receiving means for receiving an advertisement of path information, when a path from the correspondent node to the destination node has been updated, about a path from the correspondent node to the destination node after the path has been updated;
Path MTU discovery execution determining means for comparing path information of the path before the path has been updated and path information of the path after the path has been updated determining whether a discovery of a Path MTU of the path from the correspondent node to the destination node should be executed;
Path MTU setting means for setting a PATH MTU of the path after the path has been updated on the basis of the path information of the path after the path has been updated which was received by the advertisement receiving means, when the Path MTU discovery execution determining means determines that the discovery of the Path MTU should be executed; and
Path MTU announcing means for announcing to the corresponding node the Path MTU of the path after the path has been updated which was set by the Path MTU setting means when the Path MTU discovery execution determining means determines that the discovery of the Path MTU should be executed, and
wherein the correspondent node updates a Path MTU preserved in itself, based on the Path MTU announced by the Path MTU announcing means when the Path MTU announcing means announces the Path MTU.

20. A packet communication system comprised of nodes and links, wherein a destination node as a destination of a packet transmitted from a correspondent node, comprises:
multiple tunnel entry-point advertisement receiving means for receiving an advertisement of information, when a path from the correspondent node to the destination node has been updated, about an entry point of multiple tunnels on a path from the correspondent node to the destination node after the path has been updated;
Path MTU discovery execution determining means for comparing the number of entry points of multiple tunnels on the path before the path has been updated and the number of entry points of multiple tunnels on the path after the path has been updated and determining whether a discovery of a Path MTU of the path from the correspondent node to the destination node should be executed;
Path MTU calculating means for calculating the Path MTU of the path after the path has been updated on the basis of the number of entry points of multiple tunnels on the path after the path has been updated when the Path MTU discovery execution determining means determines that the discovery of the Path MTU should be executed; and
Path MTU announcing means for announcing to the correspondent node the Path MTU of the path after the path has been updated which was set by the Path MTU setting means when the Path MTU discovery execution determining means determines that the discovery of the Path MTU should be executed,
wherein the correspondent node updates a Path MTU preserved in itself, based on the Path MTU announced by the Path MTU announcing means when the Path MTU announcing means announces the Path MTU.

21. A packet communication system comprised of nodes and links, wherein a destination node as a destination of a packet transmitted from a correspondent node, comprises:
link MTU advertisement receiving means for receiving an advertisement of a link MTU, when a path from the correspondent node to the destination node has been updated, of a link connected to each node on a path from the correspondent node to the destination node after the path has been updated;

Path MTU setting means for setting a Path MTU of the path from the correspondent node to the destination node after the path has been updated, out of link MTUs received by the link MTU advertisement receiving means;

Path MTU discovery execution determining means for comparing Path MTU of the path before the path has been updated and Path MTU of the path after the path has been updated which was set by the Path MTU setting means and determining whether a discovery of a Path MTU should be executed; and Path MTU announcing means for announcing to the correspondent node the Path MTU of the path after the path has been updated which was set by the Path MTU setting means when the Path MTU discovery execution determining means determines that the discovery of the Path MTU should be executed, wherein the correspondent node updates a Path MTU preserved in itself, based on the Path MTU announced by the Path MTU announcing means when the Path MTU announcing means announces the Path MTU.

22. A Path MTU discovery method at a destination node as a destination of a packet transmitted from a correspondent node in a packet communication system comprised of nodes and links, said method comprising:

an advertisement receiving step of receiving an advertisement of path information, when a path from the correspondent node to the destination node has been updated, about a path from the correspondent node to the destination node after the path has been updated;

a Path MTU discovery execution determining step of comparing path information of the path before the path has been updated and path information of the path after the path has been updated determining whether a discovery of a Path MTU of the path from the correspondent node to the destination node should be executed;

a Path MTU setting step of setting a Path MTU of the path after the path has been updated on the basis of the path information of the path after the path has been updated which was received in the advertisement receiving step, when the Path MTU discovery execution determining step determines that the discovery of the Path MTU should be executed; and a Path MTU announcing step of announcing to the correspondent node the Path MTU of the path after the path has been updated which was set in the Path MTU setting step when the Path MTU discovery execution determining step determines that the discovery of the Path MTU should be executed.

23. A Path MTU discovery method at a destination node as a destination of a packet transmitted from a correspondent node in a packet communication system comprised of nodes and links, said method comprising:

a multiple tunnel entry-point advertisement receiving step of receiving an advertisement of information, when a path from the correspondent node to the destination node has been updated. about an entry point of multiple tunnels on the path from the correspondent node to the destination node after the path has been updated;

a Path MTU discovery execution determining step of comparing the number of entry points of multiple tunnels on the path before the path has been updated and the number of entry points of multiple tunnels on the path after the path has been updated and determining whether a discovery of a Path MTU of the path from the correspondent node to the destination node should be executed;

a Path MTU calculating step of calculating the Path MTU of the path after the path has been updated on the basis of the number of entry points of multiple tunnels on the path after the path has been updated when the Path MTU discovery execution determining step determines that the discovery of the Path MTU should be executed; and a Path MTU announcing step of announcing to the correspondent node the Path MTU of the path after the path has been updated which was calculated in the Path MTU calculating step when the Path MTU discovery execution determining step determines that the discovery of the Path MTU should be executed.

24. A Path MTU discovery method at a destination node as a destination of a packet transmitted from a correspondent node in a packet communication system comprised of nodes and links, said method comprising:

a link MTU advertisement receiving step of receiving, when a path from the correspondent node to the destination node has been updated, an advertisement of a link MTU of a link connected to each node on a path from the correspondent node to the destination node after the path has been updated;

a Path MTU setting step of setting a Path MTU of the path from the correspondent node to the destination node after the path has been updated, out of link MTUs received in the link MTU advertisement receiving step;

a Path MTU discovery execution determining step of comparing Path MTU of the path before the path has been updated and Path MTU of the path after the path has been updated which was set in the Path MTU setting step and determining whether a discovery of a Path MTU should be executed; and a Path MTU announcing step of announcing to the correspondent node the Path MTU of the path after the path has been updated which was set in the Path MTU setting step when the Path MTU discovery execution determining step determines that the discovery of the Path MTU should be executed.

25. The node as set forth in claim 1, wherein the advertisement receiver is configured to receive the advertisement of path information including information about any one or more of link MTUs, path MTU, and entry points of multiple tunnels.

26. The node as set forth in claim 1, wherein the destination node is a mobile node.

* * * * *